INVENTORS.
ALVIN A. CHERIN,
ROBERT ROYCE JOHNSON,
BY Lester S. Hecht
THEIR ATTORNEY.

Jan. 31, 1961 A. A. CHERIN ET AL 2,969,913
CIRCUITS FOR SELECTIVELY SHIFTING, EXTRACTING, AND INSERTING DIGITAL INFORMATION
Filed Feb. 23, 1954
6 Sheets-Sheet 2

INVENTORS.
ALVIN A. CHERIN,
ROBERT ROYCE JOHNSON,
BY Lester S. Hecht
THEIR ATTORNEY.

Jan. 31, 1961 A. A. CHERIN ET AL 2,969,913

CIRCUITS FOR SELECTIVELY SHIFTING, EXTRACTING, AND INSERTING DIGITAL INFORMATION

Filed Feb. 23, 1954

6 Sheets-Sheet 3

INVENTORS:
Alvin A. Cherin
Robert Royce Johnson

By Edw. A. Ogh... [signature]
Their Attorney

Jan. 31, 1961 A. A. CHERIN ET AL 2,969,913

CIRCUITS FOR SELECTIVELY SHIFTING, EXTRACTING, AND INSERTING DIGITAL INFORMATION

Filed Feb. 23, 1954 6 Sheets-Sheet 4

INVENTORS:
Alvin A. Cherin
Robert Royce Johnson
By Edwin A. Orr
Their Attorney

Jan. 31, 1961 A. A. CHERIN ET AL 2,969,913

CIRCUITS FOR SELECTIVELY SHIFTING, EXTRACTING, AND INSERTING DIGITAL INFORMATION

Filed Feb. 23, 1954 6 Sheets-Sheet 5

INVENTORS:
Alvin A. Cherin
Robert Royce Johnson

By [signature]
Their Attorney

INVENTOR.
ALVIN A. CHERIN,
ROBERT ROYCE JOHNSON,
BY Lester S. Hecht
THEIR ATTY.

United States Patent Office 2,969,913

Patented Jan. 31, 1961

2,969,913

CIRCUITS FOR SELECTIVELY SHIFTING, EXTRACTING, AND INSERTING DIGITAL INFORMATION

Alvin A. Cherin, Torrance, and Robert Royce Johnson, Altadena, Calif., assignors to Hughes Aircraft Company, Culver City, Calif., a corporation of Delaware Filed Feb. 23, 1954, Ser. No. 411,695

16 Claims. (Cl. 235—157)

This invention relates to improvements in circuits for selectively shifting, extracting, and inserting digital information and, more particularly, to improved circuits for preparing serially applied input information for a subsequent operation by simultaneously shifting and extracting a specified portion thereof; or for preparing a selected series of information digits for entry into a predetermined position in another information group by simultaneously shifting and inserting the selected series into the predetermined position.

Circuits for selectively shifting, extracting, and inserting such as are contemplated by the present invention, find particular application in high-speed electronic business data handling systems wherein it is necessary to extract a portion of input information in a particular memory location and to shift the extracted portion in preparation for an arithmetic or other operation; or wherein it is necessary to insert the result of an arithmetic or other logical operation into a set of output data which may then constitute a new business record.

The present invention provides an extension of the basic principles introduced in two copending U.S. patent applications: Serial No. 474,926, for "Program Control Units for Business Data Handling Systems," by Shirley Levinsohn, filed December 13, 1954; and Serial No. 396,702, for "Circuits for Selectively Shifting, Extracting, and Inserting Digital Information," by Robert Royce Johnson et al., filed December 7, 1953. In the copending application by Shirley Levinsohn a novel shift-extract or shift-insert address code is introduced making it possible to completely specify the amount of shift as well as the portion of an information series to be extracted or inserted according to two selection code sets, in addition to those code sets required to specify the address of the information series. These code sets are referred to in the copending application as a right-hand code set $Wr^j$ and a *left*-hand code set $Wl^j$, where *j* indicates the binary digit position in the particular selection code. The code sets $Wr^j$ and $Wl^j$ are utilized to indicate the information digits to the right and to the left, respectively, of an information series W which is to be selected from an information group series including *n* digits, *n* representing any fixed information group digit length. According to the Levinsohn application, then, all addresses of memory locations for input or output information include the code sets $Wr^j$ and $Wl^j$ so that a complete control signal set is available prior to, or after, each operation, for controlling shifting and extracting or shifting and inserting selected information digit series.

The copending application by Johnson introduces circuits for simultaneously shifting and extracting or for simultaneously shifting and inserting data according to the novel address code of the Levinsohn application. In the shifting, extracting, and inserting circuits provided by Johnson, the code selection sets $Wr^j$ and $Wl^j$ are initially entered into separate control registers and converted to control signal sets $R_1^j$ and $R_2^j$ in a manner making it possible to obtain all of the shift and extract or shift and insert signals which are required. The control signal sets $R_1^j$ and $R_2^j$ are continuously compared in first and second comparator circuits, respectively, with the signals of a digit counter providing a series of code sets $D^j$ indicating an absolute time reference. The comparator circuits produce first and second comparison signals which are utilized to define extraction or insertion signals required for a logical multiplication operation for deleting non-selected information digits.

The essence of the invention defined in the Johnson et al., application is in the technique of converting signals $Wr^j$ and $Wl^j$ to sets $R_1^j$ and $R_2^j$ in a manner making it possible to obtain all of the shifting, extracting, and inserting information required with a minimum of logical gating elements and flip-flops. This conversion effectively results in the definition of circuits wherein only two flip-flop control registers are required, whereas separate shift, extract, and insert circuits such as provided by the prior art, would require at least three flip-flop control registers.

The present invention extends the principles of the Johnson et al., application by introducing a conversion technique making it possible to obtain all of the extraction or insertion signals required with a single comparator circuit, thus eliminating the necessity of one comparator flip-flop and associated circuits. Besides the obvious saving in comparator circuits, the single comparator approach results in a simpler set of extracting and inserting functions, where only a single comparator signal is required for each function. In addition, according to the present invention all extractions are performed in a single output circuit whereas the Johnson circuit requires both input and output extraction circuits.

According to the basic concept of the invention the sets $Wr^j$ and $Wl^j$ are added during input phases indicated by a control signal $\phi i$ and then an *n*'s or $(n-2)$'s complement is formed for right shift operations indicated by a control signal $Rs$. The $(n-2)$'s complement is required where the input information series includes a right-hand and a left-hand digit which are not to be selected. The *n*'s complement of the sum of $Wr^j$ and $Wl^j$ is defined as a code set representing $n-(Wr^j+Wl^j)$ except that the *n*'s complement of a zero code set remains zero. The $(n-2)$'s complement similarly represents $$n-2-(Wr^j+Wl^j)$$

The *n*'s or $(n-2)$'s complement of the sum is then compared with the time reference sets $D^j$ to formulate a comparison series $Co$ indicating the extraction to be made during right shift operations of the input phases. The sum of $Wr^j$ and $Wl^j$ or the *n*'s complement of the sum are entered into the second control register, the first register being always utilized to control shifting operations.

During output phases, represented by control signal $\phi o$, the second register receives the code set $Wr^j$ at the beginning of the insertion operation and then, after the first comparison has been completed and the comparator has been set to a 1-representing state, receives the code set $Wl^j$ which is then converted to the $n$'s or $(n-2)$'s complement. This operation makes it possible to derive a comparison signal $Co$ which directly represents a signal series required to define the insertion operation.

According to the present invention, then, the signals of the second register are always compared with the timing sets $D^j$, thus requiring a simple comparison function. In addition, the signal $Co$ always indicates the portion of the information series which is to be selected, whether during input or output operations. Thus, both extraction and insertion operations effectively become simple logical multiplication operations which may be performed in two-input "and" circuits.

Accordingly it is an object of the present invention to provide improved circuits for preparing serially applied input information for a subsequent operation by simultaneously shifting and extracting a specified portion thereof; or for preparing a selected series of information digits for entry into a predetermined position into an information group by simultaneously shifting and inserting the selected series into the predetermined position.

Another object is to provide a circuit for simultaneously shifting and extracting or shifting and inserting wherein all extracting or inserting signals are specified as a function of a single comparator signal.

A further object is to provide an electronic circuit for shifting and extracting or shifting and inserting according to right-hand and left-hand code selection sets $Wr^j$ and $Wl^j$, the code sets being mathematically added during input phases $\phi i$ and being entered during first and second comparison intervals respectively during an output phase $\phi o$, thus providing a conversion wherefrom a single comparison series may be derived for extraction or insertion.

Still another object is to provide a single comparator shifting and extracting or shifting and inserting circuit wherein extraction and insertion operations may be performed through simple logical multiplication circuits such as "and" circuits.

Yet a further object is to provide a high-speed business data shifting and extracting or shifting and inserting circuit wherein shift control signals are entered into a shift control register and extraction and insertion control signals are entered into a second control register, the signals of the second register being continuously compared with a series of time reference code sets for producing a single comparison series which is utilized to control extraction or insertion.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Fig. 1 is a block diagram of the basic embodiment of the present invention;

Figs. 1*a* and 1*b* respectively illustrate the operations of two embodiments of the invention;

Figure 5:
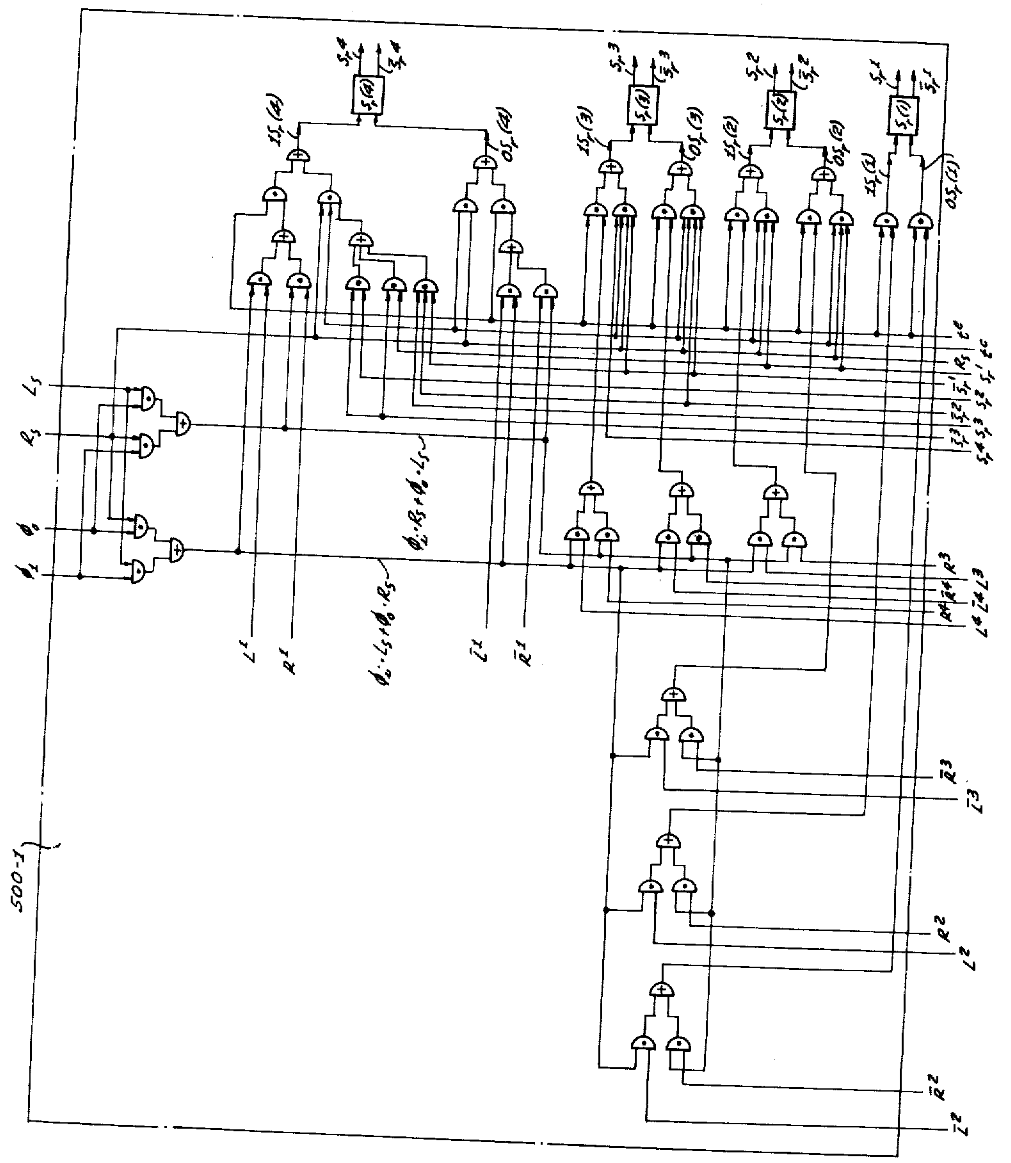
Figure 5A:
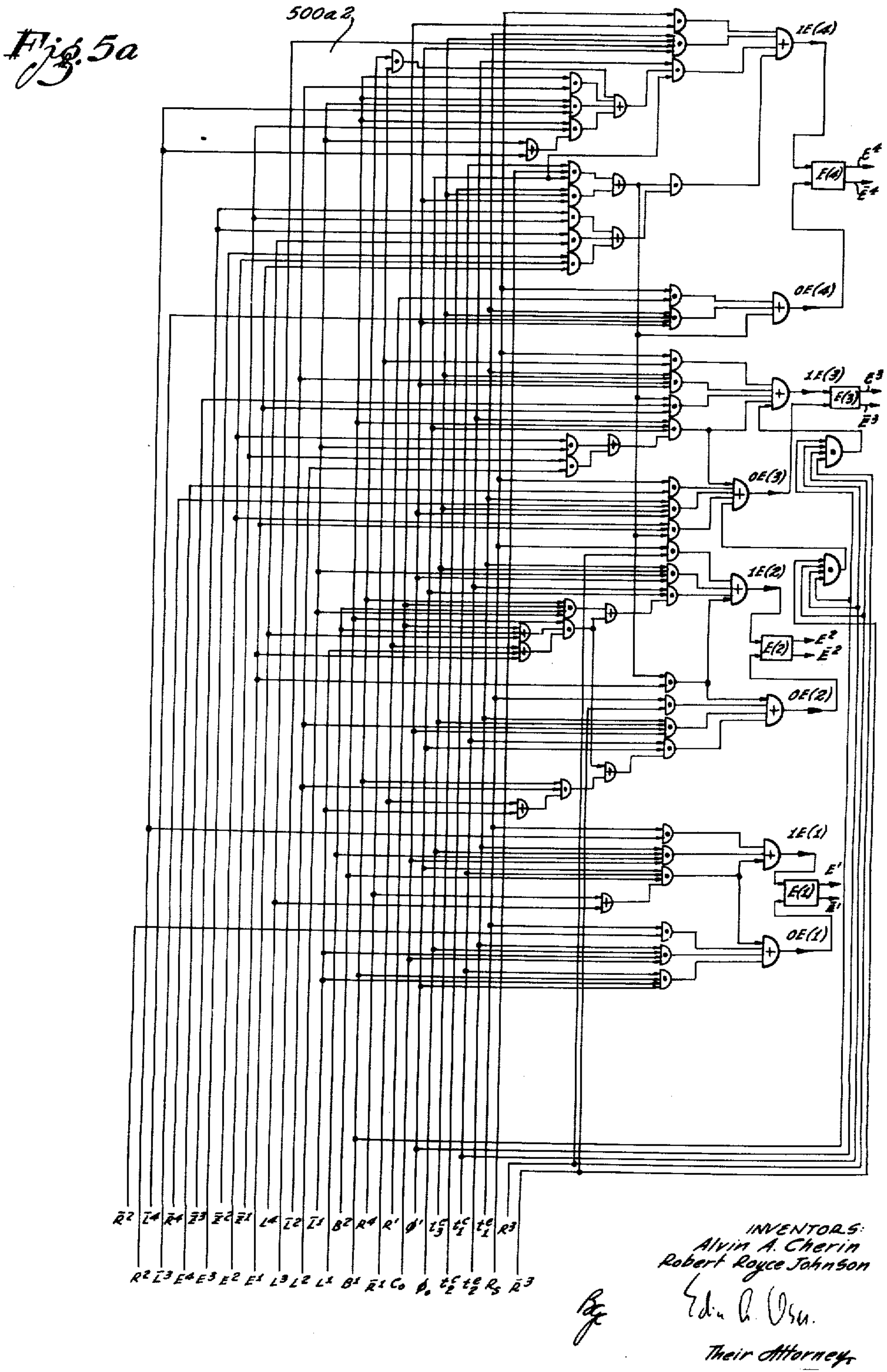
Figure 5B:
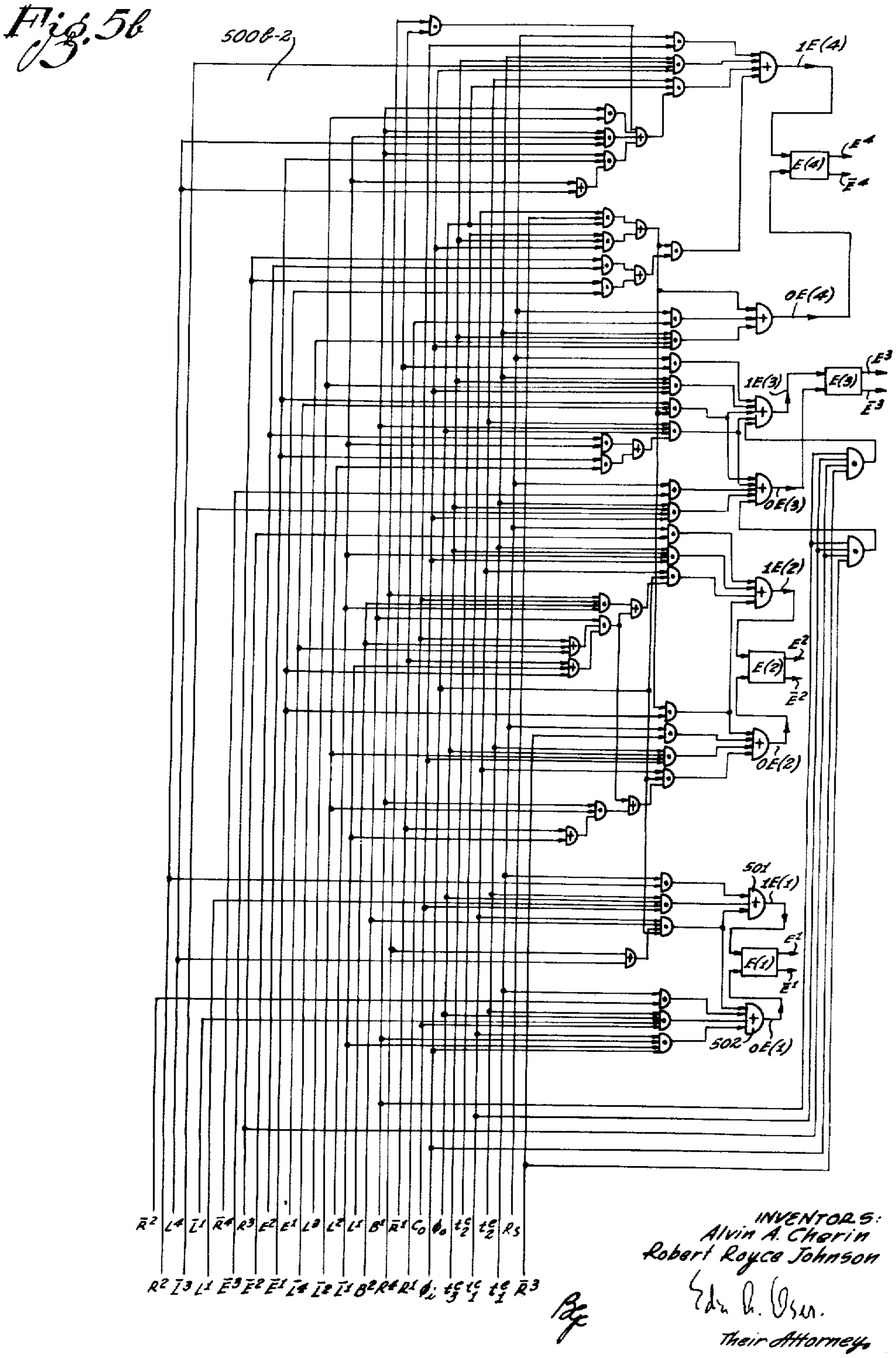

Figs. 5, and 5*a*, 5*b* illustrates respectively a suitable form for matrix 500–1; and alternate forms for matrix 500–2; and

Figure 6A:
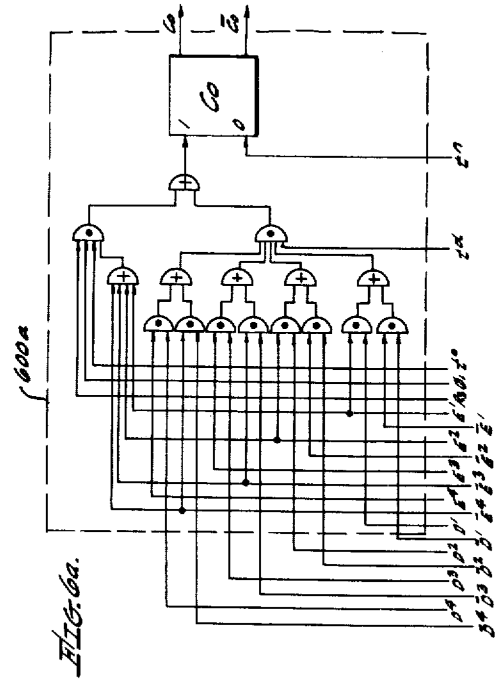
Figure 6B:
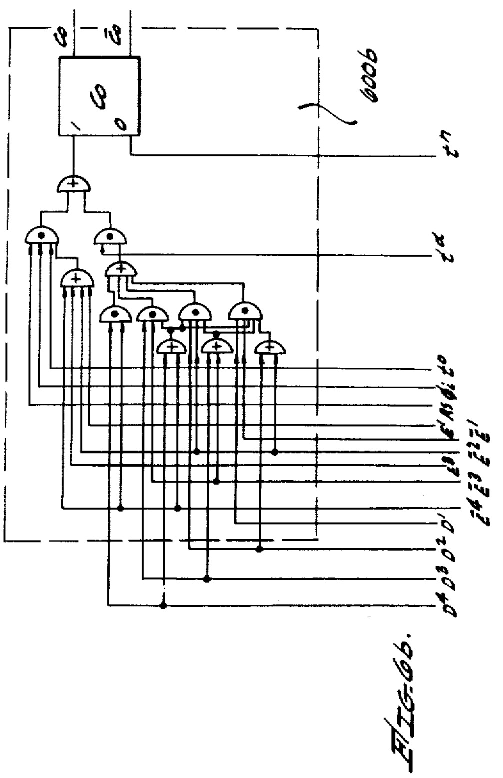

**Figs. 6*a* and 6*b* illustrate suitable forms for comparator 600.**

Figure 1:
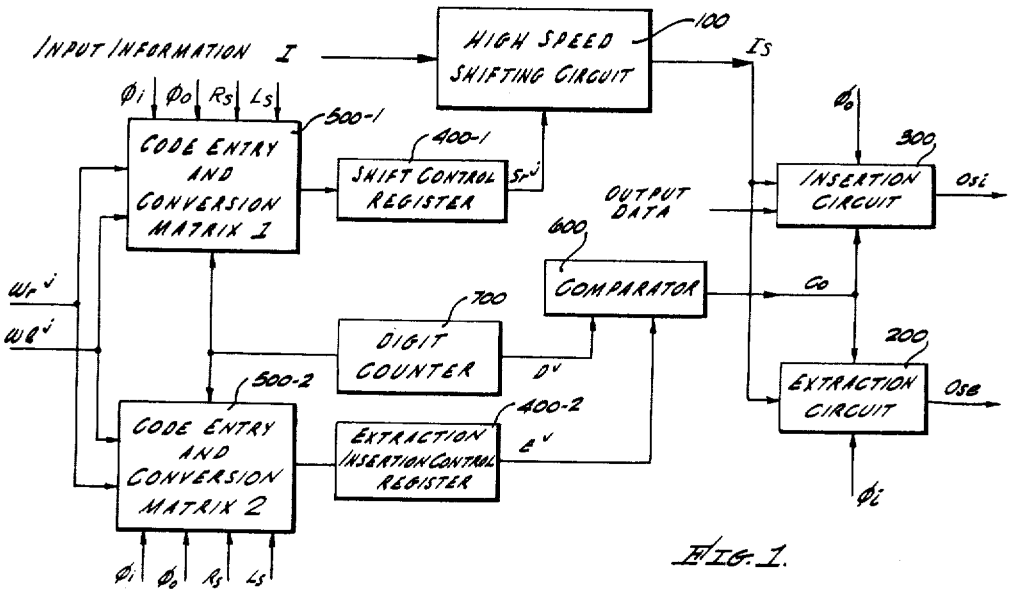

Reference is now made to Fig. 1 wherein there is shown one embodiment of a single-comparator shifting and extracting or shifting and inserting circuit according to the present invention. As shown in Fig. 1, the circuit comprises a high-speed shifting circuit 100 which receives applied input signal series I (representing any of the digits in the series $I_1 \ldots I_n$) and produces a corresponding output series $Is$ which is shifted by an amount specified by one of the code selection sets $Wr^j$ or $Wl^j$. Signal series $Is$ produced by shifting circuit 100 is applied to an extraction circuit 200 which produces an output series $Ose$ corresponding to selected digits during input phase $\phi i$; and is applied to an insertion circuit 300 which produces output signals $Osi$ corresponding to digits selected for insertion into an output data set during output phase $\phi o$.

The amount of shift is controlled by signals $Sr^j$ produced by a shift control register 400–1 which receives code sets $Wr^j$ or $Wl^j$, or conversions thereof, through a first code entry and conversion matrix 500–1. Extraction and insertion control signals $E^j$ are entered into a register 400–2 through a second code entry and conversion matrix 500–2. Signals $E^j$ are then compared in a comparator circuit 600 with a series of timing signal sets $D^j$ produced by a digit counter 700. Comparator 600 produces an output signal $Co$ which is then utilized to control the operation of extraction circuit 200 and insertion circuit 300.

Figure 2:
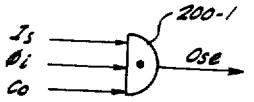
Fig. 2 is a schematic diagram of a suitable form of extraction circuit 200 shown in Fig. 1.
Figure 3:
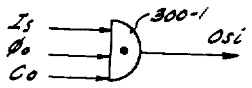
Fig. 3 is a schematic diagram of a suitable form of insertion circuit 300 of Fig. 1.

Since shifting circuit 100 and digit counter 700 are not novel with the present invention, they are not considered in detail herein; reference is made, therefore, to copending U.S. patent application Serial No. 395,212, for "Electronic Circuits for Selectively Shifting the Time Position of Digital Data," by Michael May et al., filed November 30, 1953, and to U.S. patent application Serial No. 400,395 for "Electronic Circuits for Selectively Shifting or Inverting the Time Position of Digital Data," by Robert Royce Johnson, filed December 28, 1953, wherein suitable circuits for high-speed shifting circuits are described and to copending U.S. patent application Serial No. 327,567, for "Binary-Coded Flip-Flop Counters" by E. C. Nelson, filed December 23, 1952, wherein suitable types of counters are described. Suitable forms of extraction circuit 200, insertion circuit 300, control registers 400, matrices 500, and comparator 600 are illustrated in Figs. 2; 3; 4; 5, 5*a*, 5*b*; and 6*a*, 6*b*; respectively. The mechanization of these circuits is determined according to logical equations which define the respective operations of the circuits and consequently it is considered necessary, as a preliminary discussion of the invention, to first formulate the logical problems involved. Accordingly, the discussion immediately following relates to the general logical operation of the invention rather than specific circuits.

As is more fully explained in the above-mentioned copending application by Shirley Levinsohn, the code selection sets $Wl^j$ and $Wr^j$ respectively indicate the amount of left shift and right shift to be performed during the input phases $\phi i$ of an arithmetic operation. During the output phases $\phi o$, the selected information series W is effectively shifted back and inserted into an output position. Consequently, the code sets $Wl^j$ and $Wr^j$ indicate the reverse situation, that is, the amount of right shift and left shift, respectively. The general sequence of operation required is indicated in Table I, below, wherein four situations are considered, namely: left and right shift during input phase $\phi i$; and left and right shift during output phase $\phi o$.

TABLE I

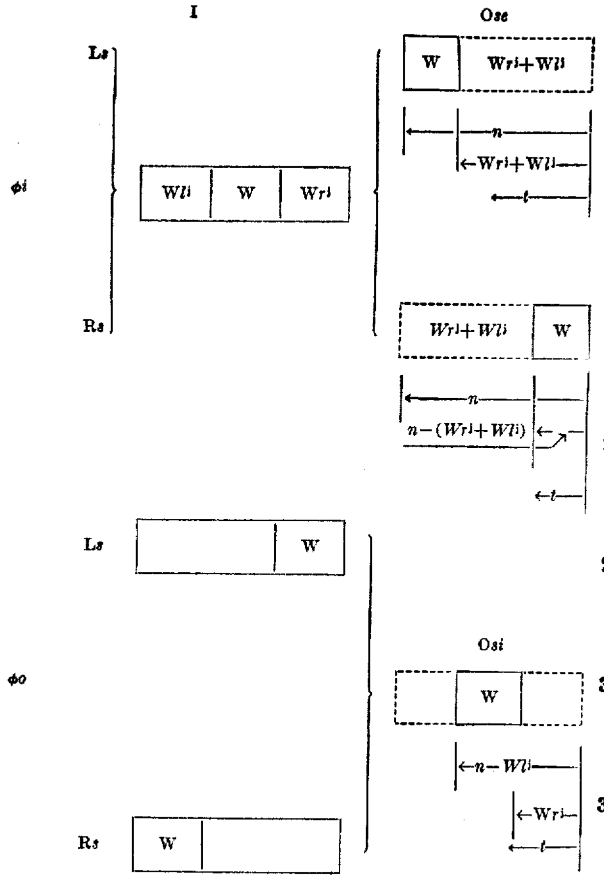

As indicated in Table I, during input phase $\phi i$ and operation L*s* (left shift) the selected series W is to be shifted to the left by $Wl^j$ digits and then a digit length equal to $Wl^j+Wr^j$ is to be deleted or nonselected to the right of selected series W. A time reference $t$ is shown in Table I indicating the relative time interval of the divisions between the selected and nonselected series. During operation R*s* (right shift) of the input phase $\phi i$, the selected series W is shifted to the right by an amount equal to $Wr^j$, and a portion corresponding to $Wr^j+Wl^j$ is deleted.

During output phase $\phi o$ the same insertion operation is performed during both operations L*s* and R*s*; namely, the insertion of that portion of the shifted input signal series occurring after a reference time interval equivalent to $Wr^j$ digits, and occurring before the end of the time interval measuring $n-Wl^j$ digits.

The general definitions of the selected and shifted signal series O*se*, O*si* may be respectively defined by the following logical equations:

$$Ose=Is.\phi i.[Ls.(t\geqq Wr^j+Wl^j)+Rs.(t\leqq n\text{-}(Wr^j+Wl^j)]$$

$$Osi=Is.\phi o.[(t\geqq Wr^j).(t\leqq n-Wl^j)]$$

where the dot (.) represents the logical "and" and the plus (+) separating terms $Ls.(t\geqq Wr^j+Wl^j)$ and $Rs.(t\leqq n-(Wr^j+Wl^j)$ represents the logical inclusive "or." The plus (+) sign in the term $Wr^j+Wl^j$ represents an addition of the values $Wr^j$ and $Wl^j$ rather than a logical "or" relationship. The function defining O*se* indicates that selected signal series O*se* is equal to the shifted input series I*s* during the input phases $\phi i$, for either of the following conditions: left shift operations (L*s*) "and" during the time interval $t\geqq Wr^j+Wl^j$; "or" right shift operations (R*s*) "and" during the time interval $t\leqq n-(Wr^j+Wl^j)$. In a similar manner the signal series O*si* corresponds to the shifted input series I*s* during output phases $\phi o$ during the time interval: $n-Wl^j\geqq t\geqq Wr^j$, the insertion being independent of the right shift or left shift control signals.

In the above-mentioned copending applications by Michael May et al., Serial No. 395,212, and by R. R. Johnson, Serial No. 400,395, there is pointed out a convenient method for shifting the time position of serially applied digital data. Thus if a series of input data is applied throughout an operating cycle comprised of $n$ successive digit periods, where it is assumed that the least significant digits are presented first, it is possible to obtain either a left shift or a right shift by inserting the appropriate amount of time delay. Where a left shift is desired the amount of time delay which is inserted is directly equal to the number of digits of the desired shift. Where a right shift is desired, the number of digits of delay is equal to ($n$ minus right shift), or to an entire operating cycle less the number of digits corresponding to the right shift which is desired. Hence the equation for time delay is as follows:

Time delay=left shift or ($n$−right shift)

The copending application by Michael May et al. describes both a suitable means for obtaining the desired amount of delay, and also appropriate gating circuits for selecting the amount of delay in accordance with applied signals which indicate either a right shift or a left shift.

The preferred method of controlling shift operations is to perform an $n$'s complement for right shift operations. Thus, during $\phi i.Rs$ operations a conversion $n-Wr^j$ is performed and during $\phi o.Rs$ the conversion $n-Wl^j$ is performed. Thus, the signals $Sr^j$ produced by the shift control register represents the code sets $Wl^j$, $n-Wr^j$, $Wr^j$, and $n-Wl^j$ during operations $\phi i.Ls$, $\phi i.Rs$, $\phi o.Ls$, and $\phi o.Rs$, respectively.

The manner in which each of the signals $Sr^j$, $E^j$, and C*o* must be defined in order to provide the necessary shift, extraction, and insertion control signals, wherein extraction and insertion are controlled according to a single comparator signal, may now be determined. The necessary conditions are presented in Table II, below.

In Table II symbol $Sr^j$ represents the amount of time delay, and C*o* is a binary variable having the value 1 during time periods when the series W is to be selected from the shifted input series I*s*. Variable C*o* is provided by a comparison between signal set $E^j$ and the digit count $D^j$, as indicated in the table.

TABLE II

| | | $Sr^j$ | $E^j$ | $Co$ |
|---|---|---|---|---|
| $\phi i$ | Ls | $Wl^j$ | $Wl^j+Wr^j$ | $Co=1$ for $n\geq D^j\geq E^j$ if $Wl^j+Wr^j\neq n$. |
| | Rs | $n-Wr^j$ | $n-(Wl^j+Wr^j)$ | $Co=1$ for $0\leq D^j\leq E^j$ if $Wl^j+Wr^j\neq n$. |
| $\phi o$ | Ls | $Wr^j$ | $E_1^j=Wr^j$ before $Co=1$; $E_2^j=n-Wl^j$ after $Co=1$ | $Co=1$ for $E_2^j\geq D^j\geq E_1^j$. |
| | Rs | $n-Wl^j$ | $E_1^j=Wr^j$ before $Co=1$; $E_2^j=n-Wl^j$ after $Co=1$ | |

The term $D^j$ indicates at any instant the number of signals introduced to the counter 700. These signals preferably occur at periodic intervals and serve as clock signals for synchronizing various operations in the computer or data processing system in which this invention may be included. The counter 700 counts on a recurrent basis between particular limits representing the number of positions in a word. For example, the counter 700 may count between "1" and "12" and may return to "1" for a new count when there are 12 positions in a word. The term $E^j$ indicates the portion of a word to be extracted in an input ($\phi i$) phase or inserted in an output ($\phi o$) phase. For example, in Table I the middle portion of a word is to be extracted during input phase $\phi i$ by shifting this portion to the positions of least significance in a right shift ($Rs$) operation or to the positions of greatest significance in a left shift ($Ls$) operation. The original relationship between the portion of the word W to be extracted and the other portions of the word is shown in the left portion of Table I. As will be seen, a portion $Wr^j$ exists to the right of the portion W in the positions of least significance and a portion $Wl^j$ exists to the left of the portion W in the positions of greatest significance.

After the portion W has been shifted to the left input positions of greatest significance, the remaining portions of the word deleted. The deleted portion has a length $Wr^j+Wl^j$. The deleted portion of the word is indicated in broken lines at the right position in Table I. The term $E^j$ indicates the portion of the word to be extracted after the shifting operation has occurred. The term $E^j$ indicates the portion of the word to be extracted after the shifting operation by defining the boundaries of this portion.

The term $Co$ represents a comparison between the signal $E^j$ and the digit count $D^j$. During the time that the digit count $D^j$ corresponds to the portion of the word to be extracted, a signal $Co$ is produced by the comparator 600 as will be described in detail subsequently. The comparator 600 may include a flip-flop which is triggered to a true state to produce signals $Co$ and which is triggered to a false state to produce signals $\overline{Co}$. The signals $\overline{Co}$ are produced when the digit count D does not correspond to the portion of the word to be extracted. The determination of $Co$ and $\overline{Co}$ is indicated in the last column of Table II.

The portions of the word to be deleted for each type of operation such as a left shift during input phase ($\phi i.Ls$) may be seen from the broken portions of the word at the right side of Table I. This has been discussed above with respect to a $\phi i.Ls$ operation. As will be seen in Table I, the portion of the word to be extracted and the positions of the extracted portion are shown in full lines at the right side of Table I. During the output phase designated by $\phi o$, the portion W at the beginning or the end of the word is shifted to the middle portion and then the portions at the beginning and the end of the word are deleted.

In a $\phi o.Ls$ operation, the middle portion of the word is obtained from the positions of least significance. Similarly, the middle portion of the word is obtained from the most significant digits in a $\phi o.Rs$ operation. During the end portions of the word after the shifting operation, $E^j$ is true and $Co$ is false to indicate that these portions are to be deleted. Since the portion W to be retained in an output phase ($\phi o$) occurs in the middle portion of the word after a shifting operation, both the beginning and the end of this portion must be defined. The beginning of the portion W after a shifting operation is indicated by signals $E_1{}^j$ in the second column of Table II, and the end of the portion W is indicated by signals $E_2{}^j$ in the second column of Table II.

In the middle portion W of the word after the shifting operation, $Co$ is true to indicate that this portion of the word is to be inserted. In the first portion of the word where deletion is to occur, a signal $\overline{Co}$ is produced by the comparator 600. The signal $\overline{Co}$ is produced until the position represented by the signals $E_1{}^j$ occurs. In the middle portion of the word as represented at W in the bottom right portion of Table I, the comparator provides a signal $\overline{Co}$ which indicates that this portion of the word is to be inserted. The comparator 600 again provides a signal $\overline{Co}$ after the count $D^j$ corresponds to $n-Wl^j=E_2{}^j$. This indicates that deletion is again to occur.

As indicated in Table II the comparator is to produce a 1-representing signal for $\phi i$ left shift operations ($\phi i.Ls$) during the time interval $n \geqq D^j \geqq E^j$, where $D^j$ again indicates a series of time reference code sets. This comparison function may be provided by setting the comparator to 1 when the set $D^j$ becomes equal to the set $E^j$ and then resetting the comparator to 0 after a time interval of $n$ digits. During $\phi i$ right shift operations ($\phi i.Rs$) the comparator must be set to a 1-representing state immediately after the 0 reference time interval and is then reset to 0 when the reference code set $D^j$ becomes equal to the code set $E^j$.

During output phases $\phi o$ the comparator is set to a 1-representing state after $D^j$ is greater than or equal to $E_1{}^j$ which is equivalent to $Wr^j$ and is then set to 0 at the end of a second comparison interval when $D^j$ becomes equal to $E_2{}^j$ which is equivalent to $n-Wl^j$. This provides the comparator function shown in Table II:

$$Co=1 \text{ for } E_2{}^j \geqq D^j \geqq E_1{}^j$$

It may thus be seen that the comparator signal $Co$ has a 1-representing value for all operations during a time interval corresponding to the time interval that the selected series W is to be extracted or inserted. The manner in which a comparator may be mechanized to provide such an operation is indicated in the functions which follow wherein both the code sets $D^j$ and $E^j$ are assumed to have 4 binary digits where $j$ has the values 1, 2, 3, and 4.

*Comparator functions*

$$1Co=Rs.\phi i.(E^j \neq n).t^0+(E^4.D^4+\overline{E}^4.\overline{D}^4).(E^3.D^3+\overline{E}^3.\overline{D}^3).(E^2.D^2+\overline{E}^2.\overline{D}^2).(E^1.D^1+\overline{E}^1.\overline{D}^1).t^d$$

$$0Co=t^n+(E^4.D^4+\overline{E}^4.\overline{D}^4).(E^3.D^3+\overline{E}^3.\overline{D}^3).(E^2.D^2+\overline{E}^2.\overline{D}^2).(E^1.D^1+\overline{E}^1.\overline{D}^1).t^d$$

where signal $t^0$ represents a timing signal occurring at the beginning of an $n$ digit time interval of operation, signal $t^n$ represents a timing signal occurring at the $n$ digit time interval, and signal $t^d$ is a timing signal occurring at the beginning of each digit time interval.

The digit count $D^j$ provided by the counter 700 may be indicated by the state of operation of a plurality of flip-flops forming a part of the counter. Since construction of a counter such as the counter 700 is well known in the art, the counter need not be shown in detail. When 12 positions are included in a word such as in the example shown in Figure 1*a*, only four flip-flops are needed to provide a count between "1" and "12" on a cyclic basis. These flip-flops may be respectively described as the D(1), D(2), D(3) and D(4) flip-flops where $D^1$, $D^2$, $D^3$ and $D^4$ represent binary digits of progressively increasing significance.

Similarly, the operation of the register 400–2 to indicate $E^j$ may be represented by the states of operation of a plurality of flip-flops. When there are 12 positions in a word such as in the example shown in Figure 1*a*, four flip-flops may be included in the register 400–2. These flip-flops may be represented as E(1), E(2), E(3) and E(4) to correspond respectively to the D(1), D(2), D(3) and D(4) flip-flops in the counter 700.

As previously described, the comparator 600 produces a signal $Co$ for a $\phi i.Rs$ operation at the beginning of a word. This may be seen from Table I which indicates at a right position that the first portion of a word is used in $\phi i.Rs$ operation. In such an operation, the comparator 600 becomes triggered at the beginning of a word when the portion to be deleted has a length less than the length of the word. This can be represented as $1Co=Rs.\phi i.t^0.(E^j \neq n)$ where the length of the word is indicated by $n$.

In a $\phi i.Rs$ operation, the comparator 600 continues to produce a signal Co until $D^j$ becomes equal to $E^j$. This is represented by patterns of operation in the D(1), D(2), D(3) and D(4) flip-flops corresponding to the pattern of operation in the E(1), E(2), E(3) and E(4) flip-flops. $D^j$ corresponds to $E^j$ when the following relationship is obtained.

$$(E^4.D^4+\bar{E}^4\bar{D}^4)(E^3.D^3+\bar{E}^3.\bar{D}^3.)(E^2.D^2+\bar{E}^2.\bar{D}^2)(E^1.D^1+\bar{E}^1.\bar{D}^1)$$

In all of the operations other than $\phi i.Rs$, the comparator 600 does not produce a signal Co until some time toward the middle or end of a word. The signal Co is produced in a manner similar to that described in the previous paragraph when the digit time interval $D^j$ in the word becomes equal to the term $E^j$. Upon a coincidence between $D^j$ and $E^j$, the flip-flop in the comparator 600 becomes triggered to produce the signal Co. For a $\phi i.Ls$ operation, the flip-flop in the comparator continues to produce a signal Co until the end of the word as represented by digit time interval $t^n$. At digit time interval $t^n$, the flip-flop in the comparator again becomes triggered to the false state as represented by $0Co=tn$. For an output phase ($\phi o$) operation, the flip-flop in the comparator becomes triggered to the true state to produce a signal Co when $D^j$ equals $E_1{}^j$. The comparator continues to provide a signal Co until $D^j$ equals $E_2{}^j$. At this time, the flip-flop in the comparator becomes triggered to the false state to produce a signal $\overline{Co}$. Thus, it will be seen that the Co flip-flop in the comparator 600 initially becomes triggered true when the D(1), D(2), D(3) and D(4) flip-flops have a pattern of operation corresponding respectively to the E(1), E(2), E(3) and E(4) flip-flops. The Co flip-flop in the comparator subsequently becomes triggered false when the D(1), D(2), D(3) and D(4) flip-flops have patterns of operation corresponding to those of the E(1), E(2), E(3) and E(4) flip-flops. As will be seen from the previous discussion, the relationship between the D flip-flops the E flip-flops in the equations for 1Co and 0Co provide an indication of the term $E^j.D^j$. For $\phi o$ operations $E^j$ can be subdivided into the terms $E_1{}^j$ and $E_2{}^j$. The term $E_1{}^j$ is used to set the flip-flop in the comparator 600 true for the production of Co signals during the $\phi o$ operation. Similarly, the term $E_2{}^j$ is used to reset the comparator for the production of $\overline{Co}$ signals at the end of a word during the $\phi o$ operation.

According to these comparator functions the comparator is set to 1 in response to a signal applied to input circuit 1Co for right shift operations of input phases ($Rs.\phi i$) when $E^j$ is not equal to $n(E^j \neq n)$, or is set to 1 when $E^j=D^j$. The restriction that $E^j$ be not equal to $n$ is introduced so that it is possible to completely delete or nonselect all digits as will be more fully understood when the operation of the invention is described with reference to Figs. 1*a* and 1*b*.

The comparator is reset to 0 when $D^j=E_2{}^j$ or upon the application of signal $t^n$. With this operation, then, the comparator signal Co always has a 1-representing value indicating the presence of the selected portion W. Thus, output signal series Ose and Osi may be defined as simple "and" functions of the shifted input signals Is as follows in Equations 200 and 300:

(200) $Ose=Is.\phi i.Co$
(300) $Osi=Is.\phi o.Co$

In observing Table II it will be noted that the signal set $Sr^j$ is a function of set $Wl^j$ during the operations $\phi i.Ls$ or $\phi o.Rs$ and is a function of set $Wr^j$ during $\phi i.Rs$ or $\phi o.Ls$. The $n$'s complement is then to be performed for right shift operations. Thus, the desired signals $Sr^j$ may be obtained by first entering sets $Wr^j$ or $Wl^j$ during the appropriate operation and then forming the $n$'s complement. This transition is indicated by the logical function:

$$Sr^j=Te.[Wl^j.(\phi i.Ls+\phi o.Rs)+Wr^j.(\phi i.Rs+\phi o.Ls)]+Tc.Rs.(n-X^j)$$

where Te and Tc respectively represent time intervals following entry and conversion. The variable $X^j$ is utilized to represent either $Wr^j$ or $Wl^j$ which has previously been entered into the corresponding flip-flop $Sr(j)$ in register 400–1. This function indicates that $Sr^j$ corresponds to $Wl^j$ during the operation $\phi i.Ls+\phi o.Rs$, or to $Wr^j$ during the operation $\phi i.Rs+\phi o.Ls$, during the entry period Te; and then corresponds to $n-Wr^j$ or $n-Wl^j$ during the conversion period Tc of right shift.

In the equation for $Sr^j$ set forth in the previous paragraph, Te and Tc represent time intervals which may have durations of more than one digit time represented by a clock pulse. The equation is obtained from Table II. As will be seen from Table II, the time delay signals $Sr^j$ are produced directly for left shift (Ls) operations. The time delay $Sr^j$ is indicated in Table II by $Wl^j$ for a left shift operation during input phase $\phi i$ and by $Wr^j$ for a left shift operation during output phase $\phi o$. This is indicated in the equation for $Sr^j$.

During right shift (Rs) operations, the shift $Sr^j$ in the digital information is obtained by determining the $n$'s complement of either $Wr^j$ or $Wl^j$. This may be seen from Table II. For this reason, $Wl^j$ is used in a right shift operation during output phase $\phi o$ to determine the entry period Te. The $n$'s complement of $Wl^j$ is then used to determine the amount of shift during the conversion period Tc. In determining the amount of shift during the conversion period Tc, $Wl^j$ is made equal to $X^j$ in the equation for $Sr^j$. Similarly, for a right shift operation during input phase $\phi i$, $Wr^j$ is made equal to $X^j$ and the $n$'s complement as represented by $n-X^j$ is used to determine the amount of shift during the conversion period Tc.

According to Table II, signal set $E^j$ is to represent the sum of $Wl^j$ and $Wr^j$ ($Wl^j+Wr^j$) during operation $\phi i.Ls$; is to represent $n-(Wl^j+Wr^j)$ during $\phi i.Rs$; and, during output phases $\phi o$, is first to represent $Wr^j$ before Co becomes 1 and then to represent $n-Wl^j$ after Co becomes 1. This sequence of operation may be effected by first entering set $Wr^j$ into register 400–2 and by then forming the sum $Wr^j+Wl^j$ during input phases as a first conversion and the $n$'s complement of this sum during operation $Rs.\phi i$ in a second conversion. The signal set $Wl^j$ is entered during a second entry period of output phase $\phi o$ when the comparator signal Co is 1 and is converted to an $n$'s complement during a third conversion period. This sequence of operation may be expressed logically as follows:

$$E^j=Te_1.Wr^j+Te_2.\phi o.Wl^j.Co+Tc_1.(Wr^j+Wl^j).\phi i+(Tc_2.Rs.\phi i+Tc_3.\phi o.Co).(n-X^j)$$

where $Te_1$ and $Te_2$ represent first and second entry periods and $Tc_1$, $Tc_2$, and $Tc_3$ represent first, second, and third conversion periods, and $X^j$ represents either $Wr^j+Wl^j$ or $Wl^j$. It will be noted that where the plus (+) sign is utilized without space it represents the addition of two signal sets, whereas where the plus (+) is separated by spaces it represents the logical inclusive "or."

The value $E^j$ as expressed in the equation in the previous paragraph may be seen from the following discussion and from reference to Table II. This equation indicates the sequence of steps by which $E^j$ may be determined for the various types of operation. As a first step, $E^j$ is determined from $Wr^j$ during the entry period $Te_1$. The entry of $Wr^j$ into the register 400–2 produces values of $E_1{}^j$ for both left shift and right shift operations during output phase $\phi o$. During input phase $\phi i$, the entry of $Wr^j$ has no utility of itself but provides a first step in determining $Wr^j+Wl^j$. For this reason, the value $Wr^j$ is converted into a value $Wr^j+Wl^j$ during the first conversion period $Tc$ for entry into the register 400–2 where $Wr^j+Wl^j$ represents an addition of $Wr$ and $Wl$. This conversion is made only during input phase $\phi i$ as represented by $Tc_1$. The entry of $Wr^j+Wl^j$ during input phase $\phi i$ provides the proper form for a left shift operation. However, $Wr^j+Wl^j$ must be converted to an $n$'s complement for a right shift ($Rs$) operation during input phase $\phi i$. This occurs during the second conversion period $Tc_2$ where the conversion period $Tc_2$ occurs after the conversion period $Tc_1$. This may be seen by the function $Tc_2.Rs.\phi i.(n-X^j)$ where $X^j$ equals $Wr^j+Wl^j$.

As previously described, the signal set $Wr^j$ is entered into the register 400–2 during the first entry period as represented by $Te_1$. During output phase $\phi o$, $Wl^j$ is entered into the register 400–2 at the time that the comparator signal $Co$ becomes true. This occurs during the second entry period $Te_2$. It also occurs after the first entry period has passed since the $Co$ signal can become true only after the word portion $Wr^j$ has been presented. As may be seen from Table I, the entry of $Wl^j$ is used to determine $n-Wl^j$, which defines the position in the word when the comparator again starts to produce a false signal $\overline{Co}$. The conversion of $Wl$ to $n-Wl^j$ occurs to obtain the definition of the middle portion of the word which is inserted during an output phase $\phi o$ as may be seen from Tables I and II. The insertion of the word as to the middle portion occurs during a conversion period $Tc_3$ which follows the entry period $Te_2$. The conversion period $Tc_3$ can occur only during output phase $\phi o$ and only when the comparator signal $Co$ is true. The conversion period occurs during the time $n-X^j$ where $X^j=Wl^j$. In this way, the two entry periods $Te_1$ and $Te_2$ serve to define the beginning and end of the portion of the word during which the comparator signal $Co$ is true, this portion being inserted during the conversion period $Te_3$.

Before considering the specific manner in which matrices 500 are mechanized to provide the conversions necessary to introduce signal sets $Sr^j$ and $E^j$ into registers 400–1 and 400–2, respectively, it is necessary to assume a specific code set for $Wr^j$ and $Wl^j$. As an illustration it is assumed that $n=12$ and that the code sets include four binary digits arranged in a conventional binary code. In addition it is assumed that no right shift greater than nine digits is desired. An illustrative code arrangement is shown in Table III below, wherein the set $D^j$ is also specified so that the manner of mechanization of comparator 600 will also be apparent. It will be noted that $X^j$ is utilized to represent either of the sets $Wr^j$ or $Wl^j$ and $Y^j=12-X^j$ repersents $Sr^j$ or $E^j$.

TABLE III

| | $X^j=Wr^j$ or $Wl^j$ | | | | | $12-X^j=Y^j$ | | | | $D^j=t$ |
|---|---|---|---|---|---|---|---|---|---|---|
| | $X^4$ | $X^3$ | $X^2$ | $X^1$ | | $Y^4$ | $Y^3$ | $Y^2$ | $Y^1$ | 4321<br>0000 0<br>0001 1<br>0010 2<br>0011 3<br>0100 4<br>0101 5<br>0110 6<br>0111 7<br>1000 8<br>1001 9<br>1010 10<br>1011 11<br>0000 12=0 |
| (0) | 0 | 0 | 0 | 0 | (12) | 0 | 0 | 0 | 0 | |
| (1) | 0 | 0 | 0 | 1 | (11) | 1 | 0 | 1 | 1 | |
| (2) | 0 | 0 | 1 | 0 | (10) | 1 | 0 | 1 | 0 | |
| (3) | 0 | 0 | 1 | 1 | (9) | 1 | 0 | 0 | 1 | |
| (4) | 0 | 1 | 0 | 0 | (8) | 1 | 0 | 0 | 0 | |
| (5) | 0 | 1 | 0 | 1 | (7) | 0 | 1 | 1 | 1 | |
| (6) | 0 | 1 | 1 | 0 | (6) | 0 | 1 | 1 | 0 | |
| (7) | 0 | 1 | 1 | 1 | (5) | 0 | 1 | 0 | 1 | |
| (8) | 1 | 0 | 0 | 0 | (4) | 0 | 1 | 0 | 0 | |
| (9) | 1 | 0 | 0 | 1 | (3) | 0 | 0 | 1 | 1 | |

From Table III the $n$'s or 12's complement functions for providing the conversion $12-X^j=Y^j$ are found to be:

$$Y^1=X^1$$
$$Y^2=X^2.\overline{X^1}+\overline{X^2}.X^1$$
$$Y^3=X^3.X^2+X^3.X^1+X^4.\overline{X}^1$$
$$Y^4=\overline{X}^3.X^2+\overline{X}^3.X^1+X^3.\overline{X}^2.\overline{X}^1$$

The equations set forth in the previous paragraph may be seen from a comparison of the Y(1), Y(2), Y(3) and Y(4) flip-flops and the X(1), X(2), X(3) and X(4) flip-flops for the different counts in Table III. As may be seen, Table III represents a particular example where a word has 12 digital positions such that $n=12$. Table III is included to indicate the relationship between $X^j=Wr^j$ or $X^j=Wl^j$ on the one hand and $Y^j=12-X^j$ on the other hand. Because of this relationship, $Y^j$ decreases in value as $X^j$ increases in value.

It will be seen from Table III that the Y(1) flip-flop is true whenever the X(1) flip-flop is true. This may be seen by comparing the pattern of operation of the Y1 and X1 flip-flops in corresponding horizontal rows of Table III. This results from the fact that the value of $Y^j$ is odd whenever the value of $X^j$ is odd. Table III also indicates that the Y(2) flip-flop is true whenever either the X(1) flip-flop or the X(2) flip-flop is false and the other quantity is true. This may be represented as $Y^2=X^2.\overline{X}^1+\overline{X}^2.X^1$.

Y is true when $X^j$ has values of 5 to 8, inclusive. Values of 5 to 7 may be defined as $X^3.X^1$; a value of 6 may be defined as $X^3.X^2$; and the value of 8 may be defined as $X^4.\overline{X}^1$. In like manner, $Y^4$ is true when $X^j$ has values of 1 to 4, inclusive. Values of 2 and 3 may be defined $\overline{X}^3.X^2$; a value of 1 may be defined as $\overline{X}^3.X^1$; and a value of 4 may be defined $X^3.\overline{X}^2.\overline{X}^1$.

Figure 4:
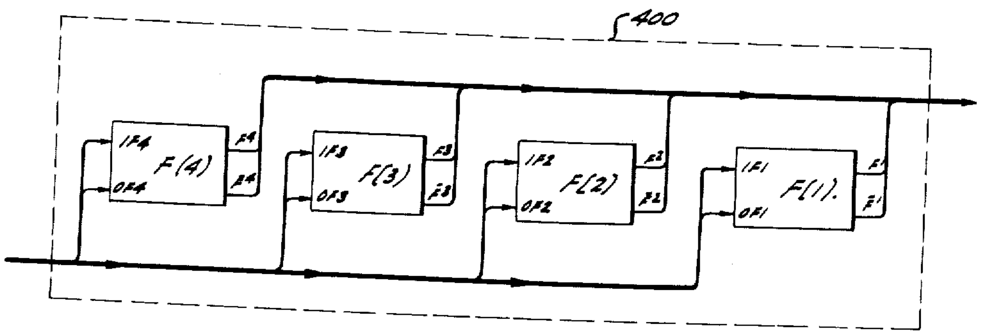
Fig. 4 illustrates a suitable form for registers 400 of Fig. 1.

These basic conversion functions then define the conversion which must be performed in registers 400, the general form of which is illustrated in Fig. 4. As indicated in Fig. 4, registers 400 include four flip-flops F(1), F(2), F(3), and F(4) producing complementary output signal pairs $F^1$, $\overline{F}^1$; $F^2$, $\overline{F}^2$; $F^3$, $\overline{F}^3$; and $F^4$, $\overline{F}^4$ and having 1 and 0 input circuit pairs 1F1, 0F1; 1F2, 0F2; 1F3, 0F3; and 1F4, 0F4, respectively. The flip-flops are conventional circuits having input circuits such that the separate application of pulses to the 1 and 0 input circuits of a flip-flop sets the flip-flop to 1 or 0 representing stable states and the simultaneous application of pulses to both input circuits triggers the flip-flop or changes its stable state. Since register 400 shown in Fig. 4 represents either register 400–1 or register 400–2 shown in Fig. 1, the symbol F in the equations which follow may represent either $Sr$ or E.

Since the signal set $X^j$, representing either $Wr^j$ or $Wl^j$ is entered into flip-flops $F(j)$ prior to the conversion operation which forms the set $12-X^j=Y^j$, a simpler conversion function set may be obtained because of the flip-flop characteristics. These functions may be expressed as follows:

$$1F1=0F1=0$$
$$1F2=0F2=F^1$$
$$1F3=F^4.\overline{F}^1$$
$$0F3=\overline{F}^2.\overline{F}^1$$
$$1F4=\overline{F}^3.F^2+\overline{F}^3.F^1+F^3.\overline{F}^2.\overline{F}^1$$
$$0F4=1$$

It has been previously described that the entry of information into the shift control register 400–1 and into the extraction-insertion control register 400–2 may occur on a progressive basis during successive time intervals. For example, information may be entered into the register 400–2 during periods of entry ($Te$) and may be subsequently converted during periods of conversion ($Tc$). Since the periods of entry and the periods of conversion follow one another, the same flip-flops may be used in the successive periods to control the particular digit time intervals in the word to be entered or converted. These flip-flops may be defined as the F(1), F(2), F(3) and F(4) flip-flops. When no $n$'s complement is to be obtained, the F(1), F(2), F(3) and F(4) flip-flops respectively correspond to the X(1), X(2), X(3) and X(4) flip-flops in Table III. When the $n$'s complement is to be performed, the F(1), F(2), F(3) and F(4) flip-flops respectively correspond to the Y(1), Y(2), Y(3) and Y(4) flip-flops in Table III.

The equations for 1F1, 0F1, 1F2, 0F2, 1F3, 0F3, 1F4 and 0F4 set forth above indicate the logic for controlling the conversion of the F flip-flops from X flip-flops to Y flip-flops. They are derived from the equations for $Y^1$, $Y^2$, $Y^3$ and $Y^4$ set forth immediately below Table III.

For example, the equations $1F1=0F1=0$ is obtained because no change has to be made in the F(1) flip-flop to convert the flip-flops from the $X^1$ operation to a $Y^1$ operation. Similarly, the equation $1F2=F1$ represents a simplified conversion of the equation $Y^2$. It indicates that the F(2) flip-flop is triggered true from a false state to represent $Y^2$ when the F(1) flip-flop representing $X_2{}^1$ is in the true state. The equation for $Y^2$ also indicates that the Y(2) flip-flop is true when $X^2.\bar{X}^1$ is true. However, the F(2) flip-flop does not have to be changed at such times to represent $Y^2$ since it is already in the true state to represent $X^2$.

Similarly, the terms $X^3.X^2$ and $X^3.X^1$ do not have to be included in the equation for 1F3 since the F(3) flip-flop is already true because $X^3$ is true. This causes the equation for $Y^3$ to become simplified to only the last term in the equation such that $1F3=F^4.\bar{F}^1$. The equation for $Y^4$ cannot be simplified in any way since the term $X^4$ is not included in the equation. For this reason, the equation for 1F4 corresponds to the equation for $Y^4$.

Since the manner of providing flip-flop functions has been presented on frequent occasions in numerous copending applications, it is not considered necessary for the purpose of describing this invention to include a discussion of this general technique herein. Reference is made to the following U.S. patent applications: (1) Serial No. 327,131, for "Binary Coded Flip-Flop Counters," by Robert R. Johnson, filed December 20, 1952; (2) Serial No. 378,307, for "Result-From-Carry Adder-Subtracters," by John V. Blankenbaker, filed September 3, 1953; and (3) Serial No. 378,116, for "Multiple Input Binary-Coded Decimal Adders and Subtracters," by J. V. Blankenbaker, filed September 2, 1953; wherein the general theory of flip-flop conversion functions is considered.

The manner in which these functions operate to provide the desired conversions may be demonstrated by considering the code transition shown in Table III. The conversion for flip-flop F(1) indicates that once having entered the signal $X^1$ into this flip-flop no further change need be made to form $Y^1$. The signal $Y^2$ is obtained from the signal $X^2$ registered in flip-flop F(2) by triggering this flip-flop if $X^1$ is 1, $X^1$ being represented by signal $R^1$ after the entry into register 400. The significance of the other conversions may be determined through a similar analysis.

Although various methods may be utilized for entering signals into registers 400, such as the parallel entry technique described in the above-mentioned copending application by R. R. Johnson et al.; as an illustration of another variation a serial entry will be described herein. In order to achieve the serial entry the input signal sets $Wl^j$ and $Wr^j$ are circulated in separate registers, which are not shown in the drawings, producing signal sets $L^j$ and $R^j$, respectively. The correspondence between signals $Wl^j$ and $Wr^j$ represented as $X^j$ and signals $L^j$ and $R^j$ during successive binary time intervals $B^1$, $B^2$, $B^3$, and $B^4$ is indicated in Table IV below:

TABLE IV

| | $R^4$ $L^4$ | $R^3$ $L^3$ | $R^2$ $L^2$ | $R^1$ $L^1$ |
|---|---|---|---|---|
| $B^1$ | $X^4$ | $X^3$ | $X^2$ | $X^1$ |
| $B^2$ | $X^1$ | $X^4$ | $X^3$ | $X^2$ |
| $B^3$ | $X^2$ | $X^1$ | $X^4$ | $X^3$ |
| $B^4$ | $X^3$ | $X^2$ | $X^1$ | $X^4$ |

As previously described, the indications representing $X^j$ in the X(1), X(2), X(3) and X(4) flip-flops may be used to represent either $Wr^j$ or $Wl^j$.

In Table IV, the different binary digits representing $Wr^j$ are indicated by $R^1$, $R^2$, $R^3$ and $R^4$. Similarly, the different binary digits representing $Wl^j$ are designated as $L^1$, $L^2$, $L^3$ and $L^4$. In order to obtain the addition of $Wr^j$ and $Wl^j$ in successive digits, the values may be circulated in separate registers such that successive digits are presented to $R^1$ and $L^1$ in sequence for addition. For example, in a first timing interval $B^1$, the values representing the least significant digit for $Wr^j$ and $Wl^j$ are respectively presented to $R^1$ and $L^1$. These values are represented as $X^1$ in Table IV. Similarly, in the second binary time interval $B^2$, the values of $Wr^j$ and $Wl^j$ in the digit of second least significance are respectively presented to $R^1$ and $L^1$ for addition. These values are indicated as $X^2$ in Table IV. Thus, in each successive time interval, the values of $Wr^j$ and $Wl^j$ in digits of progressively increasing significance are presented to the $R^1$ and $L^1$ for addition.

Since signals representing $Wr^j$ and $Wl^j$ are serially available as signals $R^j$ and $L^j$, respectively, during binary time intervals $B^1$, $B^2$, $B^3$, $B^4$; it is apparent that the sum $Wr^j+Wl^j$ may be formed serially. However, such an addition requires a carry flip-flop and necessitates a rather complicated gating matrix at input circuit of flip-flop E(4) of register 400–2. Consequently, it appears preferable to utilize a parallel adder which is now to be described.

In analyzing the parallel adder it is convenient to refer to Table V below wherein the variables $C^{j-1}$, $C^j$, and $S^j$ are introduced representing respectively the binary carry over to the $j$th position, the binary carry formed in the $j$th position, and the binary sum in the $j$th position:

TABLE V

| $Wr^j$ | $Wl^j$ | $C^{j-1}$ | $C^j$ | $S^j$ |
|---|---|---|---|---|
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 |

Table V indicates the various possible combinations of $Wr^j$ and $Wl^j$ for any digit with the carry C from the previous digit to the particular digit. These various combinations are indicated in the first three vertical columns of Table V. The values in the first three columns are added to determine the binary results $S^j$ for the particular digit and the carry $C^j$ from the particular digit to the next digit. These values are indicated in the last two vertical columns of Table V.

Although several methods of parallel addition are possible, an efficient technique appears to be to first enter the first and second carry signals $C^1$ and $C^2$ into flip-flops E(1) and E(2), respectively, during time $B^1$ and then to form the sum digits $S^j$ during time $B^2$. In referring to Table V it is noted that $S^j$ is equal to the complement of the carry $C^j$ ($\overline{C^j}$) whenever:

$$(Wr^j+Wl^j+C^{j-1}).(\overline{Wr^j}+\overline{Wl^j}+\overline{C^{j-1}})=1$$

It will be seen from Table V that the binary sum for any particular digit has a value which is complementary relative to the carry from that digit to the next digit whenever the values in the first three columns are not all "0" or are not all "1." This is indicated by the equation given immediately above.

Thus the sum digit $S^1$ is equal to $\overline{C}^1$ for the condition:

$$Wr^1+Wl^1=1$$

$S^1=\overline{C}^1$ for the condition expressed in the previous equation since $S^1$ is "0" and $C^1$ is "1" when both $Wr^1$ and $Wl^1$ are true and since $S^1$ is true and $C^1$ is false when one of the quantities $Wr^1$ and $Wl^1$ is true. $S^2$ equals $\overline{C}^2$ whenever:

$$(Wr^2+Wl^2+C^1).(\overline{Wr^2}+\overline{Wl^2}+\overline{C^1})=1$$

Since, according to the sequence of operation outlined above, the digit $Wr^3$ is entered into flip-flop E(3) before the addition of $Wr^j$ and $Wl^j$ it is possible to form the sum digit $S^3$ by complementing the state of flip-flop E(3) whenever $Wr^3$ differs from $S^3$. Signals $Wr^3$ and $S^3$ are found to be complements from Table V whenever:

$$(\overline{C}^2.Wl^3+C^2.\overline{Wl^3})=1$$

The equation expressed in the previous sentence represents a binary value of "1." This binary value of "1" produces a binary value of "0" for $S^3$ when added to a binary value of "1" for $Wr^3$ and produces a binary value of "1" for $S^3$ when added to a binary value of "0" for $Wr^3$. This shows that $Wr^3$ and $S^3$ are complements whenever the relationship expressed immediately above for $C^2$ and $Wl^3$ is true.

In a similar manner it is possible to form the sum digit $S^4$ by complementing the state of flip-flop E(4) whenever:

$$(\overline{C}^3.Wl^4+C^3.\overline{Wl^4})=1$$

A further simplification is possible in this case since the maximum sum possible may be assumed to be equal to $12(n)$. Thus, if $Wl^4$ is equal to 1, $S^4$ must be equal to 1 and therefore the 1-input function for flip-flop E(4) may be defined as:

$$1E(4)=Wl^4+C^3$$

no signal being required for the 0-input circuit of flip-flop E(4) since if signal $Wr^4$ is initially 0 flip-flop E(4) is to remain in a 0 state unless either $Wl^4$ or $C^3$ is equal to 1.

The input functions for flip-flop E($j$) for forming the sum $Wl^j+Wr^j$ may then be expressed as follows:

$$1E(1)=B^1.C^1+B^2.(Wr^1+Wl^1)$$
$$0E(1)=B.\overline{C}^1+B^2.(Wr^1+Wl^1)$$
$$1E(2)=B^1.C^2+B^2.(Wr^2+Wl^2+C^1).(\overline{Wr^2}+\overline{Wl^2}+\overline{C}^1)$$
$$0E(2)=B^1.\overline{C}^2+B^2.(Wr^2+Wl^2+C^1).(\overline{Wr^2}+\overline{Wl^2}+\overline{C}^1)$$
$$1E(3)=B^1.Wr^3+B^2(\overline{C}^2.Wl^3+C^2.\overline{Wl^3})$$
$$0E(3)=B^1.\overline{Wr^3}+B^2.(\overline{C}^2.Wl^3+C^2.\overline{Wl^3})$$
$$1E(4)=B^1.Wr^4+B^2.(Wl^4+C^3)$$
$$0E(4)=B^1.\overline{Wr^4}$$

where signals $B^1$ and $B^2$ are shown as illustrative timing scheme for performing the addition.

The logic for the equations expressed in the previous paragraph will now be explained. These equations indicate a two-step operation for obtaining the sum of $Wl^j$ and $Wr^j$ on a parallel basis. As a first step, the carry $C^1$ or $\overline{C}^1$ is determined by the addition of $Wr$ and $Wl$ in the least significant digit. At the same time, the carry $C^2$ and $\overline{C}^2$ is determined by the addition of $Wr^2$ and $Wl^2$ in the second least significant digit and the carry $C^1$ and $\overline{C}^1$ from the previous position. The determinations of the carries $C^1$ and $C^2$ occur during the first time interval $B^1$. The exact manner of determining $C^1$ and $C^2$ will be explained in detail in connection with a set of equations listed below.

After the carries $C^1$ and $C^2$ have been determined in the first time interval $B^1$, the sum of the quantities in the different digits is determined during a second time interval $B^2$. The sum in each digit represents the value obtained by adding $Wr^j$ and $Wl^j$ for that digit and the carry $C^{j-1}$ from the previous digit.

When the carry $C^1$ is true at the end of time interval $B^1$, this indicates that both $Wr^1$ and $Wl^1$ are true. For a true state of both $Wr^1$ and $Wl^1$, the sum $E^1$ should be false. For this reason, the $E^1$ flip-flop is triggered from the true state to the false state in the time interval $B^2$ when $Wr^1$ or $Wl^1$ is true.

The $C^1$ carry may be false as represented by $\overline{C}^1$ when either $Wr^1$ or $Wl^1$ is false. When there is no carry as represented by $\overline{C}^1$, the E(1) flip-flop should be triggered true when either $Wr^1$ or $Wl^1$ is true. This indicates that the sum of $Wr^1$ and $Wl^1$ is true. This is represented by the logic $0E(1)=B^1.\overline{C}^1+B^2.(Wr^1+Wl^1)$.

The carry $C^2$ for the position of second least significance is determined during the time interval $B^1$. In the time interval $B^2$, a determination is made in accordance with Table V to learn whether at least one of the quantities $Wr^j$, $Wl^j$ and $C^{j-1}$ is true and at least one of these quantities is false. If such a situation exists, the carry indication represented by the fourth vertical column would be complementary to the same indication as represented by the fifth vertical column. Under these circumstances, the E(2) flip-flop would be triggered false during time interval $B^2$ if it were triggered true during time interval $B^1$ by a $C^2$ carry. Similarly, the E(2) flip-flop would be triggered false from a true state during time interval $B^2$ if it remained false in time interval $B^1$ because of a $\overline{C}^2$ indication for the carry. Equations for 1E(3) and 0E(3) are predicated upon an initial triggering of the E(3) flip-flop during time interval $B^1$ in accordance with the value of $Wr^3$. For example the $E^3$ flip-flop is triggered true at time interval $B^1$ when $Wr^3$ is true. If a binary indication of 1 for either $Wl^3$ or the carry $C^2$ from the previous position is added to an indication of 1 for $Wr^3$, the binary result in the third position is "0" and a carry is obtained to the next position. The binary result of "0" is produced by triggering the E(3) flip-flop to the false state in accordance with the logic expressed above for the flip-flop. As will be seen, the logic expressed for 1E(3) and 0E(3) becomes operative only when one of the quantities $Wl^3$ and $C^2$ is true. When both quantities are false, the E(3) flip-flop should remain in the state of operation corresponding to the value of $Wr^3$. The E(3) flip-flop should also remain in the state of operation corresponding to $Wr^3$ when both $Wl^3$ and $C^2$ are true. This results from the fact that true states for both $Wl^3$ and $C^2$ correspond to a binary value of "0" and a binary carry of "1" to the next position. This binary value of "0" should not affect the state of operation produced for the $E^3$ flip-flop by the binary value of $Wr^3$. The logic for the $E^4$ flip-flop indicates that the $E^4$ flip-flop remains false unless certain conditions exist. The $E^4$ flip-flop remains false because of the equation $0E(4)=0$. The special conditions for triggering the E(4) flip-flop true occur either when $Wl^4$ is true or when there is a carry $C^3$ from the previous position.

These functions may then be written entirely in terms of signals $Wr^j$, $Wl^j$, $E^j$, and the timing signals by forming the carry signals as a function of signals $Wl^j$ and $Wr^j$ at time $B^1$ and then replacing the carry signals with corresponding signals $E^j$ at time $B^2$. With these substitutions the addition functions may be expressed as follows:

$$1E(1)=B^2.Wr^1+Wl^1)$$
$$0E(1)=B^1.\overline{Wl^1}+B^2.(Wr^1+Wl^1)$$

$$1E(2)=B^1.Wl^2.Wr^1.Wl^1+B^2.(Wr^2+Wl^2+E^1).(\overline{Wr^2}+\overline{Wl^2}+\overline{E^1})$$
$$0E(2)=B^1.\overline{Wl^2}.(\overline{Wr^1}+\overline{Wl^1})+B^2.(Wr^2+Wl^2+E^1).(\overline{Wr^2}+\overline{Wl^2}+\overline{E^1})$$

$$1E(3)=B^1.Wr^3+B^2.(\overline{E^2}.Wl^3+E^2.\overline{Wl^3})$$
$$0E(3)=B^1.\overline{Wr^3}+B^2.(\overline{E^2}.Wl^3+E^2.\overline{Wl^3})$$

$$1E(4)=B^1.Wr^4+B^2.[Wl^4+Wl^3.Wr^3+E^2.(Wl^3+Wr^3)]$$
$$0E(4)=B^1.\overline{Wr^4}$$

The equations set forth in the previous paragraph represent an extension of corresponding equations set forth above. In the equations set forth in the previous paragraph, the carry signals $C^1$ and $C^2$ determined during time interval $B^1$ are respectively stored in the $E^1$ and $E^2$ flip-flops at the end of the time interval. For this reason, the quantities $E_1^1$ and $E_2^2$ can be respectively substituted for $C^1$ and $C^2$ so as to be available for use during time interval $B^2$.

The manner of determining the $E^1$ and $E^2$ carries during time interval $B^1$ can be also seen from the logic set forth in the equations two paragraphs above. For example, the E(1) flip-flop may be initially triggered in accordance with the value of $Wr^1$ before the time interval $B^1$. The E(1) flip-flop then remains true during the time interval $B^1$ for a binary value of "1" for $Wl^1$ so as to indicate a binary carry of "1" for $C^1=E^2$. The E(1) flip-flop is triggered false at time interval $B^1$ for a false state for $Wl^1$ so as to indicate a binary carry of "0" for $C^1$.

Similarly, the E(2) flip-flop is initially triggered in accordance with the value of $Wr^2$ before the time interval $B^1$. When the E(2) flip-flop has a binary value of "0" because of a binary value of "0" for $Wr^2$, it can be triggered true during the time interval $B^1$ only when $Wl^2$ and the carry $C^1$ from the previous position are both true. The carry $C^1$ can be true only when both $Wr^1$ and $Wl^1$ are true. For this reason, the E(2) flip-flop is triggered true during the time interval $B^1$ only when the "and" condition represented by $Wl^2.Wr^1.Wl^1$ exists.

The E(2) flip-flop may be initially true because of a binary indication of "1" for $Wr^2$.

Under such circumstances, the E(2) flip-flop remains true during the time interval $B^1$ to indicate a carry when either $Wl^2$ or the carry $C^1$ from the previous position is true. The E(2) flip-flop becomes triggered false to indicate a lack of carry when both $Wl^2$ and the carry $C^1$ from the previous position are false. A lack of carry from the previous position is obtained when at least one of the quantities $Wr^1$ and $Wl^1$ is false. For this reason, the E(2) flip-flop can be triggered false during time interval $B^1$ when the state of operation represented by $\overline{Wl^2}.(\overline{Wr^1}+\overline{Wl^1})$ exists.

The carry $C^3$ in the equation for $1E^4$ is obtained during the time interval $B^2$ in a manner similar to that expressed above for obtaining the carries $C^1$ and $C^2$ during the time interval $B^1$. The carry $C^3$ is obtained when both $Wl^3$ and $Wr^3$ have binary indications of 1. A carry $C^3$ is also obtained when at least one of the quantities $Wl^3$ and $Wr^3$ has an indication of 1 at the same time that there is a carry of 1 from the previous position as represented by $C^2$ or $E^2$. In this way, the logic $1E(4)=Wl^3.Wr^3+E^2.(Wl^3+Wr^3)$ is obtained.

It will be noted that since $Wr^1$ is initially in flip-flop E(1) the carry $C^1$ may be entered therein quite simply by setting the flip-flop to 0 whenever $Wl^1$ is 0 ($\overline{Wl^1}=1$). This indicates that the carry $C^1$ is 1 if both $Wr^1$ and $Wl^1$ are 1. In a similar manner the carry signal $C^2$ is entered into flip-flop E(2). Flip-flop E(2) is set to 1 if $Wr^2$ is initially 0 whenever $Wr^1$ and $Wl^1$ are 1 (producing a carry $C^1$) and signal $Wl^2$ is 1. On the other hand, if $Wr^2$ is 1 and flip-flop E(2) is initially set to 1, flip-flop E(2) is reset to 0 whenever $Wr^1$ or $Wl^1$ is 0 (indicating no carry $C^1$) and $Wl^2$ is 0.

$$1E(1)=B^2.(R^4+L^4)$$
$$0E(1)=B^1.\overline{L^1}+B^2.(R^4+L^4)$$

$$1E(2)=B^1.L^2.R^1.L^1+B^2.(R^1+L^1+E^1).(\overline{R^1}+\overline{L^1}+\overline{E^1})$$
$$0E(2)=B^1.\overline{L_2}.(\overline{R^1}+\overline{L^1})+B^2.(R^1+L^1+E^1).(\overline{R^1}+\overline{L^1}+\overline{E^1})$$

$$1E(3)=B^1.R^3+B^2.(\overline{E^2}.L^2+E^2.\overline{L^2})$$
$$0E(3)=B^1.\overline{R^3}+B^2.(\overline{E^2}.L^2+E^2.\overline{L^2})$$

$$1E(4)=B^1.R^4B^2.[L^3+L^2.R^2+E^2(L^2+R^2)]$$
$$0E(4)=B^1.\overline{R^4}$$

The equations set forth in the previous paragraph are derived from the previous set of equations and from Table IV. In the equations set forth in the previous paragraph, the terms $L^1$, $L^2$, $L^3$ and $L^4$ are respectively substituted for $Wl^1$, $Wl^2$, $Wl^3$ and $Wl^4$ during the timing interval $B^1$. Similarly, the terms $R^1$, $R^2$, $R^3$ and $R^4$ are respectively substituted for the terms $Wr^1$, $Wr^2$, $Wr^3$ and $Wr^4$ during the time interval $B^1$.

During the timing interval $B^2$, all of the quantities have shifted by one digit in the registers indicated schematically in Table IV, the signals in these registers in turn controlling the entry of signals into the registers 400–1 and 400–2. This may be seen from the fact that the digits of least significance for $Wl^1$ and $Wr^1$ appear in the $L^1$ and $R^1$ flip-flops during time interval $B^1$. Similarly, the digits of second least significance as represented by $Wl^2$ and $Wr^2$ respectively appear in the $L^1$ and $R^1$ flip-flops during the time interval $B^2$.

During the time intervals $B^2$, the digits of least significance have been shifted to the $L^4$ and $R^4$ flip-flops. For this reason the term $B2.(Wr^1+Wl^1)$ is converted to $B2(R^4+L^4)$ since $Wr^1$ and $Wl^1$ would respectively appear in the $R^4$ and $L^4$ flip-flops during time interval $B^2$. Similarly, other conversions can be made in the equations set forth two paragraphs above in accordance with the operation set forth above in this paragraph.

Two sets of flip-flop entering and conversion functions may now be specified defining the mechanization of matrices 500a–1 and 500a–2 as follows:

$$(500a\text{–}1)\begin{cases}1Sr(4)=t^e.[L^1.(\phi i.Ls+\phi o.Rs)+R^1.(\phi i.Rs+\phi o.Ls)]+t^e.Rs.(\overline{Sr^3}.Sr^2+\overline{Sr^3}.Sr^1+Sr^3.\overline{Sr^2}.\overline{Sr^1})\\0Sr(4)=t^e.[\overline{L^1}.(\phi i.Ls+\phi o.Rs)+\overline{R^1}.(\phi i.Rs+\phi o.Ls)]+t^e.Rs\\1Sr(3)=t^e.[L^4.(\phi i.Ls+\phi o.Rs)+R^4.(\phi i.Rs+\phi o.Ls)]+t^e.Rs.Sr^4.\overline{Sr^1}\\0Sr(3)=t^e.[\overline{L^4}.(\phi i.Ls+\phi o.Rs)+\overline{R^4}.(\phi i.Rs+\phi o.Ls)]+t^e.Rs.\overline{Sr^2}.\overline{Sr^1}\\1Sr(2)=t^e.[L^3(\phi i.Ls+\phi o.Rs)+R^3.(\phi i.Rs+\phi o.Ls)]+t^e.Rs.Sr^1\\0Sr(2)=t^e.[\overline{L^3}.(\phi i.Ls+\phi o.Rs)+\overline{R^3}.(\phi i.Rs+\phi o.Ls)]+t^e.Rs.Sr^1\\1Sr(1)=t^e.[L^2.(\phi i.Ls+\phi o.Rs)+R^2.(\phi i.Rs+\phi o.Ls)]\\0Sr(1)=t^e.[\overline{L^2}.(\phi i.Ls+\phi o.Rs)+\overline{R^2}.(\phi i.Rs+\phi o.Ls)]\end{cases}$$

$$
(500a\text{-}2)\begin{cases}
1E(4)=t_1{}^e.R^1+t_2{}^e.\phi o.L^4.Co+t_1{}^e.\phi i[B^1.R^4+B^2.L^3+B^3.L^3.R^3+B^3.E^3.(L^3+R^3)]+(t_2{}^e.Rs.\phi i+t_3{}^e.\phi o.Co).(\overline{E}^3.E^2+\overline{E}^3.E^1+E^3.\overline{E}^2.\overline{E}^1) \\
0E(4)=t_1{}^e.\overline{R}^1+t_2{}^e.\phi o.L^4.Co+t_2{}^c.Rs.\phi i+t_3{}^c.\phi o.Co \\
1E(3)=t_1{}^e.R^4+t_2{}^e.\phi o.L^3.Co+(t_2{}^c.Rs.\phi i+t_3{}^c.\phi o.Co).E^4.\overline{E}^1+t_1{}^c\ \phi i.B^1.R^3+t_1{}^c.\phi i.B^2(\overline{E}^2.L^3+E^2.\overline{L}^3) \\
0E(3)=t_1{}^e.\overline{R}^4+t_2{}^e.\phi o.\overline{L}3.Co+(t_2{}^c.Rs.\phi i+t_3{}^c.\phi o.Co).\overline{E}^2.\overline{E}^1+t_1{}^c\ \phi i.B^1.\overline{R}^3+t_1{}^c.\phi i.B^2.(\overline{E}^2.L^3+E^2.\overline{L}^3) \\
1E(2)=t_1{}^e.R^3+t_2{}^e.\phi o.L^2.Co+t_1{}^c.\phi i.[B^1.R^1.L^1.L^2+B^2.(R^1+L^1+E^1).(\overline{R}^1+\overline{L}^1+\overline{E}^1)]+(t_2{}^c.Rs.\phi i+t_3{}^c.\phi o.Co).\overline{E}^1 \\
0E(2)=t_1{}^e.\overline{R}^3+t_2{}^e.\phi o.\overline{L}^2.Co+t_1{}^c.\phi i.[B^1.(\overline{R}^1+\overline{L}^1).\overline{L}^2+B^2.(R+L^1+E^1).(\overline{R}^1+\overline{L}^1+\overline{E}^1)]+(t_2{}^c.Rs.\phi i+t_3{}^c.\phi o.Co)\overline{E}^1 \\
1E(1)=t_1{}^e.R^2+t_2{}^e.\phi o.L^1.Co+t_1{}^c.\phi i.B^2.(R^4+L^4) \\
0E(1)=t_1{}^e.\overline{R}^2+t_2{}^e.\phi o.\overline{L}^1.Co+t_1{}^c.\phi i.[B^1.\overline{L}^1+B^2.(R^4+L^4)]
\end{cases}
$$

The equations set forth in the previous paragraph are obtained by combining previous sets of equations. For example, the equations for 1S*r*(4), 0S*r*(4), 1S*r*(3), 0S*r*(3), 1S*r*(2), 0S*r*(2), 1S*r*(1) and 0S*r*(1) represented as set 500*a*–1 are obtained from the equation for S*r* and the equations 1F4, 0F4, 1F3, 0F3, 1F2, 0F2, 1F1 and 0F1 set forth above a few paragraphs before Table IV. As will be seen, the equation for 1F4 is substituted for the term $n$—$X^4$ in the equation for $Sr^4$. The equation for $0Sr^4$ is obtained in a similar manner.

The equations for the E(4), E(3), E(2) and E(1) flip-flops as represented by 500*b*–2 are obtained in a manner similar to that discussed above. These equations are obtained by combining the equations for $E^j$ and 1F4, 0F4, 1F3, 0F3, 1F2, 0F2, 1F1 and 0F1 set forth above. It is believed that the derivations of these equations will be understood from the above discussion.

In the sets 500*a*–1 and 500*b*–2, certain timing sequences occur. For example, in the set 500*a*–1, $t^e$ represents a series of timing signals produced during a timing interval. The timing interval $t^e$ corresponds to the period T*e* in the equation for $Sr^j$ set forth above. Similarly, $t^c$ represents a series of timing signals corresponding to timing signals produced during the conversion period $T^c$. In the set 500*a*–2, $t_1{}^e$ represents a series of timing signals corresponding to the timing signals produced during the entry period $Te_1$ which appears in the equation for $E^j$ set forth above. In like manner, the series of timing signals $t_2{}^e$, $t_1{}^c$, $t_2{}^c$ and $t_3{}^c$ occur during periods $Te_2$, $Tc_1$, $Tc_2$ and $Tc_3$ in the equations set forth above for $E^j$.

As will be seen from the previous discussion, the operation of the code entry and conversion matrices 500–1 and 500–2 is controlled by certain entry signals $t^e$ and certain conversion signals $t^c$. The formation of these signals is in turn dependent in part upon the operation of the digit counter 700 since the counter 700 operates to distinguish each timing signal from every other counting signal. For this reason, signals from the counter 700 are shown in Figure 1 as being introduced to the code entry and conversion matrices 500–1 and 500–2.

The E(1), E(2), E(3), and E(4) flip-flops are used on a time-sharing basis for a number of different operations in determining the extraction values $E^j$. For example, the flip-flops are used in the conversion period $T_1{}^c$ to determine the sum of $Wr^j+Wl^j$. In the first time interval $B^1$ of the $T_1{}^c$ conversion period, the flip-flops E(1), E(2), F(3) and E(4) receive information such as the value of $Wr^3$ and $Wr^4$. The information received by the E(1), E(2), E(3) and E(4) flip-flops in the $B^1$ period is combined with other information in the $B^2$ period of the $T_1{}^c$ correction time to produce the sum of $Wr^j+Wl^j$.

In the next correction time interval $T_2{}^c$, the sum of $Wr^j+Wl^j$ is converted to $12-(Wr^j+Wl^j)$ in the situations when each word has 12 digits. Similarly, the E(1), E(2), E(3) and E(4) flip-flops are used during the correction time interval $T_3{}^c$ to determine the value of $12-Wl^j$ in the situations when each word has 12 digits.

The E(1), E(2), E(3) and E(4) flip-flops can be used on a time-sharing basis in the manner set forth because of the particular sequence of operations. As a first step for the sequence, the value of $Wr^j$ is entered into the E(1), E(2), E(3) and E(4) flip-flops during the first entry period $T_1{}^e$. This entry occurs for all types of operations, whether input phase $\phi i$ or output phase $\phi o$. The next step is dependent upon whether the operation is for input phase $\phi i$ or output phase $\phi o$. For an input phase $\phi i$, the value of $Wl^j$ is added to $Wr^j$ during the correction time interval $T_1{}^c$, the addition being obtained by the E(1), E(2), E(3) and E(4) flip-flops in a manner similar to that set forth in the set of operations immediately preceding the equations (500–*a*). The correction time interval $T_1{}^c$ has two clock times which have been previously designated as $B^1$ and $B^2$. At the end of the $B^2$ clock time, the value of $Wr^j+Wl^j$ is converted into a value of $12-(Wr^j+Wl^j)$ in the situations when each word has 12 digits. The conversion of the value $(Wr^j+Wl^j)$ into the 12's complement occurs during the correction time interval $T_2{}^c$.

An alternative operation is obtained for output phase $\phi o$. In the output phase $\phi o$, the value of $Wr^j$ initially entered into the E(1), E(2), E(3) and E(4) flip-flops is replaced by a value of $Wl^j$, the value of $Wl^j$ being entered into the flip-flops during the entry period $T_2{}^e$. In this way, the entry $T_2{}^e$ corresponds to the correction time interval $T_1{}^c$ except that the entry period $T_2{}^c$ occurs for an output phase $\phi o$ and the correction time interval $T_1{}^c$ occurs for an input phase $\phi i$. After the entry period $T_2{}^e$, the value of $Wl^j$ inserted into the E(1), E(2), E(3) and E(4) flip-flops is converted to a value of $12-Wl^j$ in the situations when each word has 12 digits. The entry period $T_1{}^e$ is chosen to occur at a time when the values of $Wr^1$, $Wr^2$, $Wr^3$ and $Wr^4$ are respectively stored in the R(2), R(3), R(4) and R(1) flip-flops.

As previously described, the information in the R(1), R(2), R(3) and R(4) flip-flops circulates through the flip-flops in successive time digits. As will be seen above from Table IV, the R(1), R(2), R(3) and R(4) flip-flops respectively receive information corresponding to $Wr^1$, $Wr^2$, $Wr^3$ and $Wr^4$ in the time interval after the correction time interval $T_1{}^e$. At the same time, the L(1), L(2), L(3) and L(4) flip-flops respectively store information corresponding to $Wl^1$, $Wl^2$, $Wl^3$ and $Wl^4$. For this reason, the E(1), E(2), E(3) and E(4) flip-flops respectively receive information from the R(2), R(3), R(4) and R(1) flip-flops during the entry period $T_1{}^e$ and from the L(1), L(2), L(3) and L(4) flip-flops during the entry period $T_2{}^e$.

If desired, the information relating to $Wr^1$, $Wr^2$, $Wr^3$ and $Wr^4$ can be initially stored in the E(4), E(1), E(2) and E(3) flip-flops before the entry period $T_1{}^e$. The information can be stored at such times since the E(4), E(1), E(2) and E(3) flip-flops are not being used for any other purposes at this time. Because of this, the values $R^2$, $R^3$ and $R^4$ used during entry period $T_1{}^e$ for insertion in the $E^1$, $E^2$ and $E^3$ flip-flops can be respectively replaced by $E^2$, $E^3$ and $E^4$ in the set of equations designated as (500*a*–2) set forth above.

In like manner, the S*r*(1), S*r*(2) and S*r*(3) flip-flops are not being used to store any information in the period before the entry period $T^e$. Because of this, the information inserted into the S*r*(1), S*r*(2) and S*r*(3) flip-flops in the entry period $T^e$ can be respectively stored in the S*r*(4), S*r*(3) and S*r*(2) flip-flops before the entry period $T^e$. This information can then be shifted from the S*r*(4), S*r*(3) and S*r*(2) flip-flops into the S*r*(3), S*r*(2) and S*r*(1) flip-flops in the entry period $T^e$.

The signals $t^e$ and $t_1{}^e$ are utilized to represent series of timing signals for shifting signals representing $Wl^j$ and $Wr^j$ serially into registers 400–1 and 400–2, respectively. This entry, therefore, initiates the entry periods referred to above as T*e* and $Te_1$. In a similar manner signal $t_2^e$ initiates the entry period $Te_2$ and $t^c$, $t_1^c$, $t_2^c$, and $t_3^c$ initiate corresponding periods after conversion.

Since $n$ is equal to 12 and signals $E^j$ are arranged in a conventional binary code the condition $E^j \neq 12$ may be expressed as:

$$\bar{E}^4+\bar{E}^3+E^2+E^1=1$$

Thus, the comparator function may be completely specified as:

$$1Co=Rs.\phi i.(\bar{E}^4+\bar{E}^3+E^2+E^1).t^0 +(E^4.D^4+\bar{E}^4.\bar{D}^4).(E^3.D^3+\bar{E}^3.\bar{D}^3).(E^2.D^2 +\bar{E}^2.\bar{D}^2).(E^1.D^1+\bar{E}^1.\bar{D}^1).t^d$$

$$0Co=t^n+(E^4.D^4+\bar{E}^4.\bar{D}^4).(E^3.D^3+\bar{E}^3.\bar{D}^3).(E^2.D^2 +\bar{E}^2.\bar{D}^2).(E^1.D^1+\bar{E}^1.\bar{D}^1).t^d$$

The general principles of comparator circuits and other suitable forms are described in copending U.S. patent application Serial No. 394,441 for "Electronic Magnitude Comparator" by R. R. Johnson, filed November 25, 1953.

The manner in which specific circuits are mechanized according to corresponding sets of logical equations is illustrated in Figs. 2, 3, 5, and 6 where the circuits are mechanized according to equation sets 200, 300, 500, and 600, respectively. Each "and" relationship in the equations is provided by an "and" circuit responsive to corresponding signals applied to separate input terminals. Thus, the "and" function: $Ose=Is.\phi i\ Co$ defining circuit 200 is produced in an "and" circuit 200–1 responsive to signals $Is$, $\phi i$, and $Co$ applied to separate input terminals. "And" circuit 200–1 produces a 1-representing output signal when signals $Is$, $\phi i$ "and" $Co$ are all 1-representing signals. Each "or" relationship in the equations is provided by an "or" circuit which responds to signals, representing corresponding variables, applied to separate input terminals and produces a 1-representing output signal when any one or more of the input signals is a 1-representing signal. Thus, "or" circuit 501 in circuit **500*a*–2** of Fig. 5*a* responds to signals representing the relationships $t_1^e.E^2$, $t_2^e.\phi o.Wl^1.Co$, and $t^c.B^2.(R^4+L^4)$ and produces an output signal representing the function:

$$1E(1)=t_1^e.E^2+t_2^e.\phi o.Wl^1.Co+t^c.B^2.(R^4+L^4)$$

and "or" circuit 502 responds to signals representing $t_1^e.\bar{E}^2$, $t_2^e.\phi o.\overline{Wl}^2.Co$, $t_1^c.B^1.\bar{L}^1$, and $t^c.B^2.(R^4+L^4)$ and produces a signal representing the function:

$$0E(1)=t_1^e.\bar{E}^2+t_2^e.\phi o.\overline{Wl}^2.Co+t_1^c.B^1.\bar{L}^1+t^c.B^2.(R^4+L^4)$$

where signal $t^c.B^2.(R^4+L^4)$ appears in both input functions 1E(1) and 0E(1). The mechanization of the other logical equations should be apparent from this example.

"And" and "or" circuits are now well-known in the computer art and therefore it is not deemed necessary to consider such circuits in detail in this application. Examples of such circuits are shown on pages 37 to 45 of "High-Speed Computing Devices" by Engineering Research Associates, published in 1950 by McGraw-Hill Book Company, Inc., New York and London, and on pages 511 through 514 of an article entitled "Diode Coincidence and Mixing Circuits in Digital Computers" by Tung Chang Chen, in the Proceedings of the Institute of Radio Engineers, volume 38, May 1950.

Figure 1A:
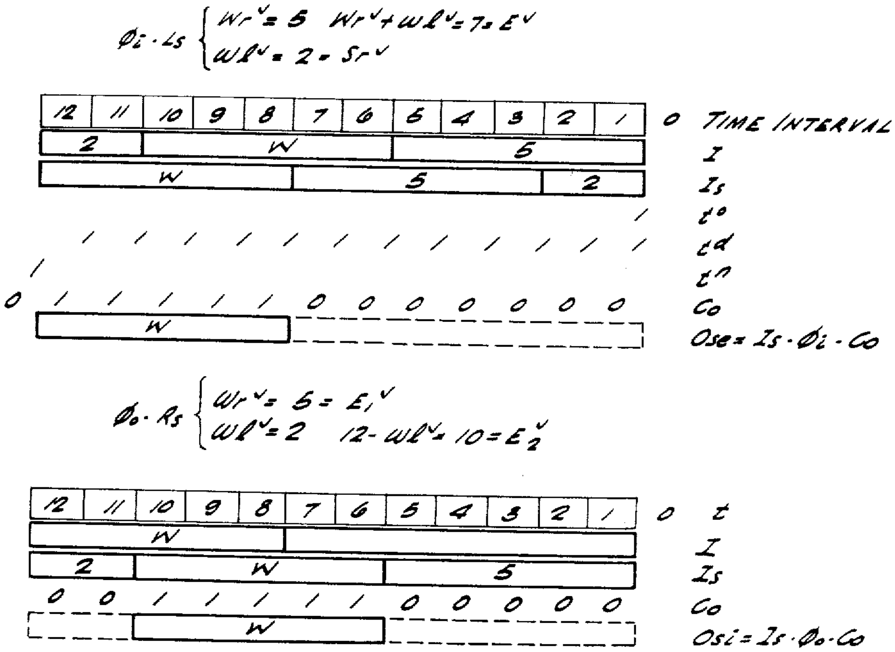

The operation of a shifting, extracting, and inserting circuit utilizing the circuits described in Figs. 2, 3, 5*a*, and 6*a* is illustrated in Fig. 1*a*, wherein it is assumed that $Wr^j$ and $Wl^j$ respectively indicate that 5 digits are to be deleted to the right of the selected series W and that 2 digits are to be deleted to the left of series W. The two operations considered are $\phi i.Ls$ and $\phi o.Rs$. During operation $\phi i.Ls$, signal set $E^j$ represents the sum of $Wr^j$ and $Wl^j$ or 7. Thus, comparator signal $Co$ remains 0 until $E^j$ is equal to $D^j$ at the end of the 7th time interval and is then set to 1 in response to one of timing signals $t^d$ at the beginning of the corresponding time intervals. The comparator is reset to 0 at the end of the operation in response to timing signal $t^n$. The output signal series $Ose$ is produced as the "and" function of signal series $Is$ and the comparator signal $Co$.

During the operation $\phi o.Rs$, signal set $E^j$ first represents the set $Wr^j$ or 5 and then, after the comparator has been set to 1, represents $12-Wl^j$ or 10. According to the comparator function in equation set 600*a* above, the comparator is set to 1 in response to signal $t^d$ after $D^j=E_1^j=5$ and then is reset to 0 after $D^j=E_2^j=10$.

In many applications of the present invention, it is necessary to shift, extract, and insert information digits where certain of the $n$ digits of the group are not numerical digits. In an illustrative situation a right-hand digit may represent a sign and the left-hand digit may be a zero or blank. In such situations the functional definitions of the various circuits must be modified somewhat, a few of the variations possible being considered below where it is assumed that the right-hand and left-hand extreme digits of the $n$-digit group are additional digits, not considered to be part of $Wr^j$ and $Wl^j$. The operation of the shifting, extracting, and inserting circuit under these conditions is illustrated in Table VI below:

TABLE VI

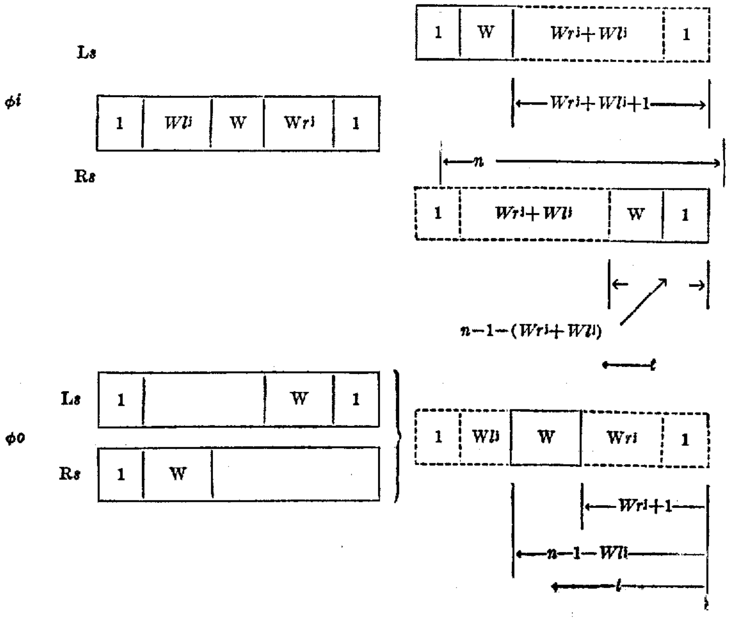

From Table VI the signal series $Ose$ and $Osi$ may be defined as follows:

$$Ose = Is.\phi i.[Ls.(t \geqq Wr^j + Wl^j + 1) + Rs.(t \leqq n-1-(Wr^j+Wl^j))]$$

$$Osi = Is.\phi o.[(t \geqq Wr^j + 1).(t \leqq n-1-Wl^j)]$$

It will be noted in analyzing the definitions of signal series $Ose$ and $Osi$ that two conversions are required to provide all of the inequality functions which are necessary. In one conversion, 1 is to be added to the sum of either $Wr^j$ and $Wl^j$, or $Wr^j$ alone, and in the other conversion the $(n-1)$'s complement of either the sum of $Wr^j$ *and* $Wl^j$, or $Wl^j$ alone, is to be formed. In addition to these conversions it is still necessary to form the $n$'s complement conversion for forming the right shift control signal set $Sr^j$. It is possible, however, to eliminate one conversion by utilizing a comparator circuit which effectively adds 1 during comparison operations, or by redefining the timing signal sets $D^j$ so that $D^j$ equals $t-1$. As is more fully explained in the above-mentioned copending application by Johnson et al., many other redefinitions are possible wherein other conversions may be utilized.

In the discussion which follows it will be assumed, then, that a "greater than" comparator is utilized which effectively adds 1 during comparison operations since the comparator signal $Co$ is not set to 1 until one digit time The values for $E^j$ in Table VII are obtained as a result of the inherent delay of one pulse position provided in the production of the comparator signals $Co$ and $\overline{Co}$. Because of this inherent delay, the value of $E^j$ for a left shift operation during input phase $(\phi i.Ls)$ can be represented as $Wl^j+Wr^j$ rather than being represented as $Wl^j+Wr^j+1$. Similarly, the inherent delay of one pulse position causes $E^j$ for a $\phi i.Rs$ operation to be represented by $n-2-(Wl^j+Wr^j)$ rather than being represented as $n-1-(Wl^j+Wr^j)$.

Utilizing comparison signal $Co$, then, signal series $Ose$ and $Osi$ may be defined again as simple "and" functions:

(200) $$Ose = Is.\phi i.Co$$

(300) $$Osi = Is.\phi o.Co$$

The general definition of signal sets $Sr^j$ and $E^j$ may be represented as follows:

$$Sr^j = Te.[Wl^j.(\phi i.Ls + \phi o.Rs) + Wr^j.(\phi i.Rs + \phi o.Ls)] + Tc.Rs.(n-X^j)$$

$$E^j = Te_1.Wr^j + Te_2.\phi o.Wl^j.Co + Tc_1.(Wr^j + Wl^j).\phi i + (Tc_2.Rs.\phi i + Tc_3.\phi o.Co).(n-2-X^j)$$

The conversions required are indicated in Table VIII wherein $n$ again is assumed to be 12 and a conventional binary counter is utilized to represent the various code sets.

TABLE VIII

| | $X^j=Wr^j+Wl^j$, $Wr^j$, or $Wl^j$ | | | | | $n=12$ $12-X^j=Y^j$ | | | | | $10-X^j=Z^j$ | | | |
|---|---|---|---|---|---|---|---|---|---|---|---|---|---|---|
| | $X^4$ | $X^3$ | $X^2$ | $X^1$ | | $Y^4$ | $Y^3$ | $Y^2$ | $Y^1$ | | $Z^4$ | $Z^3$ | $Z^2$ | $Z^1$ |
| (0) | 0 | 0 | 0 | 0 | (12) | 0 | 0 | 0 | 0 | (10) | 1 | 0 | 1 | 0 |
| (1) | 0 | 0 | 0 | 1 | (11) | 1 | 0 | 1 | 1 | (9) | 1 | 0 | 0 | 1 |
| (2) | 0 | 0 | 1 | 0 | (10) | 1 | 0 | 1 | 0 | (8) | 1 | 0 | 0 | 0 |
| (3) | 0 | 0 | 1 | 1 | (9) | 1 | 0 | 0 | 1 | (7) | 0 | 1 | 1 | 1 |
| (4) | 0 | 1 | 0 | 0 | (8) | 1 | 0 | 0 | 0 | (6) | 0 | 1 | 1 | 0 |
| (5) | 0 | 1 | 0 | 1 | (7) | 0 | 1 | 1 | 1 | (5) | 0 | 1 | 0 | 1 |
| (6) | 0 | 1 | 1 | 0 | (6) | 0 | 1 | 1 | 0 | (4) | 0 | 1 | 0 | 0 |
| (7) | 0 | 1 | 1 | 1 | (5) | 0 | 1 | 0 | 1 | (3) | 0 | 0 | 1 | 1 |
| (8) | 1 | 0 | 0 | 0 | (4) | 0 | 1 | 0 | 0 | (2) | 0 | 0 | 1 | 0 |
| (9) | 1 | 0 | 0 | 1 | (3) | 0 | 0 | 1 | 1 | (1) | 0 | 0 | 0 | 1 |

| $D^j=t$ | |
|---|---|
| 4321 | |
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |
| 1011 | 11 |
| 0000 | 12=0 |

after $D^j=E^j$. This may be accomplished by including a delay of one pulse position in the operation of the comparator 600. The delay may be provided by an additional flip-flop stage which is included in the comparator 600 to introduce signals to the output flip-flop $Co$ in the comparator. Thus, if $E^j=Wr^j+Wl^j$, the comparator effectively produces a signal $Co$ which has a value of 1 when $t \geqq Wr^j+Wl^j+1$, and if $E^1$ equals $n-2-(Wr^j+Wl^j)$ during right shift the comparator signal $Co$ equals 1 for $t \leqq n-1-(Wr^j+Wl^j)$, having been initially set to 1 by signal $t^0$. A similar operation occurs where $Wr^j$ and $n-2-Wl^j$ represent the sets $E_1^j$ and $E_2^j$, respectively; the comparator signal $Co$ having a 1-representing value during the interval $n \geqq 1-Wl^j \geqq t \geqq Wr^j+1$.

A complete set of shift, extract, and comparison functions may now be specified as in Table VII below:

Table VII

| | | $Sr^j$ | $E^j$ | $Co$ |
|---|---|---|---|---|
| $\phi i$ | $Ls$ | $Wl^j$ | $Wl^j+Wr^j$ | $Co=1$ for $n>D^j>E^j$ if $Wl^j+Wr^j \neq n-2$. |
| | $Rs$ | $n-Wr^j$ | $n-2-(Wl^j+Wr^j)$ | $Co=1$ for $0<D^j<E^j$ if $Wl^j+Wr^j \neq n-2$. |
| $\phi o$ | $Ls$ | $Wr^j$ | $E_1^j=Wr^j$ before $Co=1$; $E_2^j=n-2-Wl^j$ after $Co=1$ | $Co=1$ for $E_2^j>D^j>E_1^j$. |
| | $Rs$ | $n-Wl^j$ | $E_1^j=Wr^j$ before $Co=1$; $E_2^j=n-2-Wl^j$ after $Co=1$ | |

From Table VIII the 12's and 10's complement functions are found to be defined as follows:

$$Y^1 = Z^1 = X^1$$

$$Y^2 = \overline{Z}^2 = X^2.X^1 + \overline{X}^2.\overline{X}^1$$

$$Y^3 = X^3.X^2 + X^3.X^1 + X^4.\overline{X}^1$$

$$Y^4 = \overline{X}^3.X^2 + \overline{X}^3.X^1 + X^3.\overline{X}^2.\overline{X}^1$$

$$Z^3 = X^3.(\overline{X}^2 + \overline{X}^1) + \overline{X}^3.X^2.X^1$$

$$Z^4 = \overline{X}^4.\overline{X}^3.(\overline{X}^2 + \overline{X}^1)$$

The equations for $Z^1$, $Z^2$, $Z^3$ and $Z^4$ are obtained in a manner similar to that described above for the equations $Y_1$, $Y_2$, $Y_3$ and $Y_4$. For example, $Z^3$ becomes true for values of $X^j$ between "3" and "6," inclusive. Values of "4" and "5" for $X^j$ can be represented as $X^3.\overline{X}^2$. A value of "6" for $X^j$ can be described as $X^3.\overline{X}^1$. Similarly a value of "3" for $X^j$ can be represented as $\overline{X}^3.X^2.X^1$.

The flip-flop conversion functions may now be specified as follows:

$$Y^j=12-X^j\begin{cases}1F1=0F1=0\\1F2=0F2=F^1\\1F3=F^4.\overline{F}^1\\0F3=\overline{F}^2.\overline{F}^1\\1F4=\overline{F}^3.F^2+\overline{F}^3.F^1+F^3.\overline{F}^2.\overline{F}^1\\0F4=1\end{cases}$$

$$Z^j=10-X^j\begin{cases}1F1=0F1=0\\1F2=0F2=\overline{F}^1\\1F3=0F3=F^2.F^1\\1F4=\overline{F}^3.\overline{F}^2+\overline{F}^3.\overline{F}^1\\0F4=1\end{cases}$$

The equations for 1F1, 0F1, 1F2, 0F2, 1F3, 0F3, 1F4 and 0F4 to represent $Z^j=10-X^j$ are obtained in a manner similar to the equations for the corresponding flip-flops to represent $Y^j=12-X^j$. These equations are obtained from the equations for $Z^1$, $Z^2$, $Z^3$ and $Z^4$ set forth immediately above. For example, the equation 1F3 is obtained from the equation for $Z^3$ by eliminating the term $X^3.(\overline{X}^2+\overline{X}^1)$ since this indicates that the $F^3$ flip-flop would already be true. Furthermore, the term $\overline{X}^3.X^2.X^1$ can be simplified to $F^2.F^1$ to control the triggering of the $F^3$ flip-flop from the false state to the true state. The $X^3$ term does not have to be included since the $X^3$ (or $F^3$) flip-flop would obviously have to be in a false state to obtain a triggering of the flip-flop to the true state.

The functions for adding $Wr^j$ and $Wl^j$ as previously presented are:

$$1E(1)=B^2.(R^4+L^4)$$

$$0E(1)=B^1.\overline{L}^1+B^2.(R^4+L^4)$$

$$1E(2)=B^1.L^2.R^1.L^1+B^2.(R^1+L^1+E^1).(R^1+\overline{L}^1+\overline{E}^1)$$

$$0E(2)=B^1.\overline{L}^2.(\overline{R}^1+\overline{L}^1)+B^2.(R^1+L^1+E^1).(\overline{R}^1+\overline{L}^1+\overline{E}^1)$$

$$1E(3)=B^1.R^3+B^2.(\overline{E}^2.L^2+E^2.\overline{L}^2)$$

$$0E(3)=B^1.\overline{R}^3+B^2.(\overline{E}^2.L^2+E^2.\overline{L}^2)$$

$$1E(4)=B^1.R^4+B^2.[L^3+L^2.R^2+E^2(L^2+R^2)]$$

$$0E(4)=B^1.\overline{R}^4$$

The entry and conversion functions of matrices 500*b*–1 and 500*b*–2 shown in Fig. 5*b* may now be defined as follows:

$$(500b\text{–}1)\begin{cases}1Sr(4)=t^e.[L^1.(\phi i.Ls+\phi o.Rs)+R\ .(\phi i.Rs+\phi o.Ls)]+t^e.Rs.(\overline{Sr}^3.Sr^2+\overline{Sr}^3.Sr^1+Sr^3.\overline{Sr}^2.\overline{Sr}^1)\\0Sr(4)=t^e.[\overline{L}^1.(\phi i.Ls+\phi o.Rs)+\overline{R}^1.(\phi i.Rs+\phi o.Ls)]+t^e.Rs\\1Sr(3)=t^e.[L^4.(\phi i.Ls+\phi o.Rs)+R^4.(\phi i.Rs+\phi o.Ls)]+t^e.Rs.Sr^2.\overline{Sr}^1\\0Sr(3)=t^e.[\overline{L}^4.(\phi i.Ls+\phi o.Rs)+\overline{R}^4.(\phi i.Rs+\phi o.Ls)]+t^e.Rs.\overline{Sr}^2.\overline{Sr}^1\\1Sr(2)=t^e.[L^3.(\phi i.Ls+\phi o.Rs)+R^3.(\phi i.Rs+\phi o.Ls)]+t^e.Rs.Sr^1\\0Sr(2)=t^e.[\overline{L}^3.(\phi i.Ls+\phi o.Rs)+\overline{R}^3.(\phi i.Rs+\phi o.Ls)]+t^e.Rs.Sr^1\\1Sr(1)=t^e.[L^2.(\phi i.Ls+\phi o.Rs)+R^2.(\phi i.Rs+\phi o.Ls)]\\0Sr(1)=t^e.[L^2.(\phi i.Ls+\phi o.Rs)+\overline{R}^2(\phi i.Rs+\phi o.Ls)]\end{cases}$$

$$(500b\text{–}2)\begin{cases}1E(4)=t_1^e.R^1+t_2^e.\phi o.L^4.Co+t_1^e.\phi i[B^1.R^4+B^2.L^3+B^2.L^2.R^2+B^2.E^2.(L^2+R^2)]+(t_2^e.Rs.\phi i+t_3^e.\phi o.Co).(\overline{E}^3.\overline{E}^2+\overline{E}^3.\overline{E}^1)\\0E(4)=t_1^e.\overline{R}^1+t_2^e.\phi o.\overline{L}^4.Co+(t_2^e.Rs.\phi i+t_3^e.\phi o.Co)\\1E(3)=t_1^e.R^4+t^e.\phi o.L^3.Co+(t_2^e.Rs.\phi i+t_3^e.\phi o.Co).E^2.E^1+t_1^e.\phi i.B^1.R^3+t_1^e.\phi i.B^2(\overline{E}^2.L^2+E^2.\overline{L}^2)\\0E(3)=t_1^e.\overline{R}^4+t_2^e.\phi o.\overline{L}^3.Co+(t_2^e.Rs.\phi i+t_3^e.\phi o.Co).E^2.E^1+t_1^e.\phi i.B^1.\overline{R}^3+t_1^e.\phi i.B^2.(\overline{E}^2.L^2+E^2.\overline{L}^2)\\1E(2)=t_1^e.R^3+t_2^e.\phi o.L^2.Co+t_1^e.\phi i.[B^1.R^1.L^1.L^2+B^2.(R^1+L^1+E^1).(\overline{R}^1+\overline{L}^1+\overline{E}^1)]+(t_2^e.Rs.\phi i+t_3^e.\phi o.Co).\overline{E}^1\\0E(2)=t_1^e.\overline{R}^3+t_2^e.\phi o.\overline{L}^2.Co+t_1^e.\phi i.[B^1.(\overline{R}^1+\overline{L}^1).\overline{L}^2+B^2.(R^1+L^1+E^1).(\overline{R}^1+\overline{L}^1+\overline{E}^1)]+(t_2^e.Rs.\phi i+t_3^e.\phi o.Co).\overline{E}^1\\1E(1)=t_1^e.R^2+t_2^e.\phi o.L^1.Co+t_1^e.\phi i.B^2.(R^4+L^4)\\0E(1)=t_1^e.\overline{R}^2+t_2^e.\phi o.\overline{L}^1.Co+t_1^e.\phi i.[B^1.\overline{L}^1+B^2.(R^4+L^4)]\end{cases}$$

A "greater than" comparator for performing the comparison $D^j$, $E^j$, effectively adding 1 may be defined as follows:

$$1Co=Rs.\phi i.(\overline{E}^4+E^3+\overline{E}^2+E^1).t^0+[D^4.\overline{E}^4+(D^4+\overline{E}^4).D^3.\overline{E}^3+(D^4+\overline{E}^4).(D^3+\overline{E}^3).D^2.\overline{E}^2+(D^4+\overline{E}^4).(D^3+\overline{E}^3).(D^2+\overline{E}^2).D^1.\overline{E}^1].t^d$$

$$0Co=t^n+[D^4.\overline{E}^4+(D^4+\overline{E}^4).D^3.\overline{E}^3+(D^4+\overline{E}^4).(D^3+\overline{E}^3).D^2.\overline{E}^2+(D^4+\overline{E}^4).(D^3+\overline{E}^3).(D^2+\overline{E}^2).D^1.\overline{E}^1].t^d$$

Figure 1B:
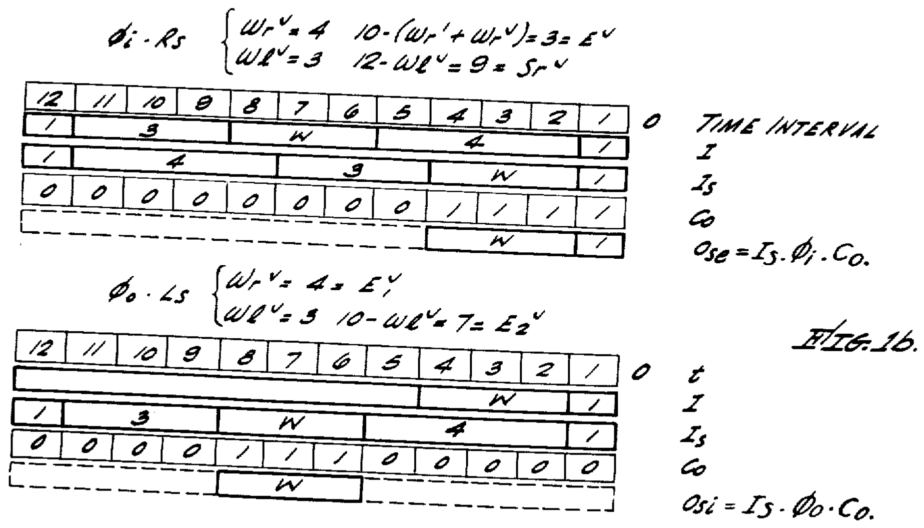

The operation of a shifting, extracting, and inserting circuit utilizing circuits 200, 300, **500*b*, and 600*b*** defined by corresponding equations above and illustrated in Figs. 2; 3; 5, 5*b*; and 6*b*, respectively; is illustrated in Fig. 1*b*. It is considered that this operation will be readily understood without further discussion, in the light of the previous analysis of Fig. 1*a*. The circuit defined by equation 500*b*–1 is the same as circuit 500*a*–1 and therefore is illustrated only once in Fig. 5.

In Figure 1*b*, the portion W to be used is originally in the 6th, 7th and 8th positions of a word having 12 positions. As a first step, the information in the word is shifted 4 positions toward the right so that the portion W appears in the 2nd, 3rd and 4th positions of the word. After this shifting operation, the positions of the word after the first four positions are deleted to obtain the signals *Ose*. The word is then shifted four positions toward the left in the output phase $\phi o$ so that the portion W is returned to the 6th, 7th and 8th positions. The portion of the word before the 6th position and the portion of the word after the 8th position are then deleted to obtain the signals *Osi*.

From the foregoing description it is apparent that the present invention provides an improved circuit for simultaneously shifting and extracting or shifting and inserting serially applied input signals wherein all extraction or inserting operations may be specified as a function of a single comparator signal. It should now be clear that as a result of the single comparator technique simple "and" circuits are all that are required in the extracting and inserting output circuits. The invention has been described with particularity with regard to an embodiment which is mechanized for a particular code, for a particular value of *n*(12), and according to a particular set of mechanization functions. It will be understood, however, that each of these parameters may be varied without departing from the spirit of the invention and, consequently, the generic concept of the invention must be considered as including a large group of modifications. Thus, the basic structure of the invention must be defined broadly as including adding means for combining the sets $Wr^j$ and $Wl^j$, single comparator means, and extracting and inserting circuits which may simply be "and" circuits.

What is claimed as new is:

1. An electronic circuit for selectively shifting and extracting, or shifting and inserting a digital information group, represented by a series of electrical input signals, the circuit being operable, in response to an applied set of control signals, to prepare the input signals for a subsequent operation by simultaneously shifting and extracting a selected serial portion thereof, or to prepare a selected serial portion of the input signals for entry into a predetermined position in another information group by simultaneously shifting and inserting the selected serial portion into the predetermined position; said circuit comprising: first code entry and conversion means, responsive to the control signals for producing shift selection signals indicating the amount of shift specified by the control signals; second code entry and conversion means responsive to the control signals for producing an extract-insert signal set indicating the amount of extraction or insertion specified by the control signals; a comparator circuit coupled to said second means and responsive to said extract-insert signal set and to applied digit time reference signals for producing a comparator signal series indicating the selected serial portion of the input signals; shifting means, coupled to said first means and responsive to said shift selection signals, for shifting the input signals by an amount specified thereby and producing corresponding shifted output signals; an extraction "and" circuit, coupled to said shifting means, and responsive to said comparator signal series, for producing an output signal series corresponding to the selected portion of the input signals; and an insertion "and" circuit, responsive to said shifted output signals and to said comparator signal series, for producing an output signal series corresponding to the selected portion to be inserted.

2. An electronic circuit for preparing a digital information group, represented by a series of electrical input signals, for a subsequent operation by simultaneously shifting and extracting a selected serial portion thereof, specified by an applied set of control signals, said circuit comprising: first means, responsive to the control signals for producing shift selection signals indicating the amount of shift specified by the control signals; second means, responsive to the control signals for producing an extract signal set indicating the amount of extraction specified by the control signals; third means, coupled to said second means and responsive to said extraction signal set and to applied digit time reference signals for producing a comparator signal series indicating the selected serial portion of the input signals; fourth means, coupled to said first means and responsive to said shift selection signals for shifting the input signals by an amount specified thereby to produce corresponding shifted output signals; and fifth means, coupled to said fourth means and responsive to said shifted output signals and to said comparator signal series for producing an output signal series corresponding to the selected portion of the input signals.

3. The circuit defined in claim 2 wherein said fifth means is an "and" circuit responsive to said shifted output signals and said comparator signal series for producing said output signal series.

4. An electronic circuit for preparing a selected portion of a digital information group, represented by a series of electrical input signals, for entry into a predetermined position in another group, by simultaneously shifting and inserting the selected serial portion into the predetermined position, the circuit being operable in response to an applied set of control signals specifying the amount and direction of the shifting and the predetermined position, said circuit comprising: first means, responsive to the control signals for producing shift selection signals indicating the amount of shift specified by the control signals; second means for producing an insert signal set indicating the amount of insertion specified by the control signals; third means, coupled to said second means and responsive to said insert signal set and to applied digit time reference signals for producing comparator signal series indicating the selected portion of the input signals; fourth means coupled to said first means and responsive to said shift selection signals for shifting the input signals by an amount specified thereby to produce corresponding shifted output signals; and fifth means, coupled to said fourth means and responsive to said shifted output signals and to said comparator signal series for inserting the selected portion of the input signals into the other information group.

5. A high-speed shifting, extracting, and inserting circuit selectively operable, in response to digit time reference signals $D^j$ and to control signals $\phi i$ and $\phi o$, respectively indicating input and output phases of operation, control signals $Rs$ and $Ls$ indicating right and left shift operations, and control signal sets $Wr^j$ and $Wl^j$ indicating the amount of shift, extraction, or insertion; to prepare, during input phases, a series of electrical input signals I representing a digital information group, for a subsequent operation by simultaneously shifting and extracting a serial portion W thereof, the portion W being specified by signal sets $Wr^j$ and $Wl^j$ respectively indicating right-hand and left-hand deletions; or to prepare, during output phases, a selected serial portion W of signals I for entry into a predetermined position in another information group, the position being specified by signal sets $Wr^j$ and $Wl^j$, the entry being performed by simultaneously shifting and inserting the portion W into the predetermined position; said shifting, extracting, and inserting circuit comprising: first means, responsive to signals $\phi i$, $\phi o$, $Rs$, $Ls$, $Wr^j$, and $Wl^j$ for producing a signal set $Sr^j$ indicating the amount of shift specified by the control signals; second means, responsive to signals $\phi i$, $\phi o$, $Rs$, $Ls$, $Wr^j$, and $Wl^j$ for producing a signal set $E^j$ indicating the amount of extraction or insertion specified by the control signals; third means, coupled to said first means and responsive to said signal set $Sr^j$ for shifting signals I by an amount specified by the control signals to produce corresponding shifted input signals $Is$; fourth means, responsive to said signal set $E^j$ and to the applied digit time reference signals $D^j$ for producing a comparator signal series indicating the time of occurrence in output signals $Is$ of the selected portion W; fifth means, responsive to said comparator signal series and to said shifted input signal series $Is$ for producing an output signal series $Ose$ corresponding to the shifted and extracted portion W; and sixth means, responsive to signals $Is$ and to said comparator signal series, for producing an output signal series $Osi$ corresponding to the selected portion W to be inserted.

6. A high-speed shifting and extracting circuit operable in response to digit time reference signals $D^j$ and to control signal $\phi i$ indicating an input phase of operation, control signals $Rs$ and $Ls$ indicating right and left shift operations, and control signal sets $Wr^j$ and $Wl^j$ indicating the amount of shift or extraction, to prepare a series of electrical input signals I representing a digital information group for a subsequent operation by simultaneously shifting and extracting a serial portion W thereof, the portion W being specified by signal sets $Wr^j$ and $Wl^j$ respectively indicating right-hand and left-hand deletions; said shifting and extracting circuit comprising: first means, responsive to signals $\phi i$, $Rs$, $Ls$, $Wr^j$, and $Wl^j$ for producing a signal set $Sr^j$ indicating the amount of shift specified by the control signals; second means, responsive to signals $\phi i$, $Rs$, $Ls$, $Wr^j$, and $Wl^j$ for producing a signal set $E^j$ indicating the amount of extraction specified by the control signals; third means, coupled to said first means and responsive to said signal set $Sr^j$ for shifting signals I by an amount specified by the control signals to produce corresponding shifted input signals $Is$; fourth means, coupled to said second means and responsive to signal set $E^j$ and to the applied digit time reference signals $D^j$ for producing a comparator signal series indicating the time of occurrence in the shifted input signals $Is$ of the selected portion W; and fifth means, coupled to said fourth means and responsive to said comparator signal series and to said shifted input signals $Is$ for producing an output signal series $Ose$ corresponding to the shifted and selected portion W.

7. A high-speed shifting and inserting circuit operable in response to digit time reference signals $D^j$ control signal $\phi o$ indicating an output phase of operation, control signals $Rs$ and $Ls$ indicating right and left shift operations, and control signal sets $Wr^j$ and $Wl^j$ indicating the amount of shift and insertion, to prepare a series of electrical input signals I representing a digital information group, for a subsequent operation by simultaneously shifting and inserting a serial portion W thereof, the portion W being specified by signal sets $Wr^j$ and $Wl^j$ respectively indicating right-hand and left-hand deletions; said shifting and inserting circuit comprising: first means, responsive to signals $\phi o$, $Rs$, $Ls$, $Wr^J$, and $Wl^J$ for producing a signal set $Sr^J$ indicating the amount of shift specified by the control signals; second means, responsive to signals $\phi o$, $Rs$, $Ls$, $Wr^J$, and $Wl^J$ for producing a signal set $E^J$ indicating the amount of insertion specified by the control signals; third means, coupled to said first means and responsive to said signal set $Sr^J$ for shifting signals I by an amount specified by the control signals to produce corresponding shifted input signals $Is$; fourth means, coupled to said second means and responsive to signal set $E^J$ and to the applied digit time reference signals $D^J$ for producing a comparator signal series indicating the time of occurrence in the shifted input signals $Is$ of the selected portion W; and fifth means, coupled to said third means and responsive to signals $Is$, and to said comparator signal series for producing an output signal series $Osi$ corresponding to the selected portion W to be inserted.

8. In an electronic business data handling system, wherein input information, represented by a corresponding series of electrical input signals I, must be rapidly prepared for subsequent operation or for insertion into an output information group; a high-speed shifting, extracting, and inserting circuit operable; in response to control signals $\phi i$ and $\phi o$ respectively indicating input and output phases of operation, control signals $Rs$ and $Ls$ respectively indicating right and left shift directions, and control signal sets $Wr^J$ and $Wl^J$ respectively indicating right-hand and left-hand portions of signal series I adjacent to a series W to be selected; to prepare, during input phases, signals I for a subsequent operation by simultaneously shifting and extracting the series portion W; or to prepare, during output phases, the selected series W for entry into the output information group; said shifting, extracting, and inserting circuit comprising: matrix conversion means, responsive to signals $\phi i$, $\phi o$, $Rs$, $Ls$, $Wr^J$, and $Wl^J$ for producing a signal set $Sr^J$ indicating the amount of shift specified by the control signals and for producing a signal set $E^J$ indicating the amount of extraction or insertion specified by the control signals; shifting means, coupled to said matrix conversion means and responsive to signal set $Sr^J$, for shifting signals I by an amount specified by the control signals to produce corresponding output signals $Is$; comparison means, coupled to said matrix conversion means and responsive to signal set $E^J$ and to applied timing signal sets $D^J$ for producing a comparison signal series $Co$ indicating the time of occurrence in output signals $Is$ of the selected portion W; extraction "and" means, coupled to said shifting means and to said comparison means and responsive to signals $Co$ for producing an output signal series $Ose$ corresponding to the shifted and extracted portion W; and insertion "and" means, coupled to said shifting means and to said comparison means and responsive to signals $Is$ and to signals $Co$ for producing an output signal series $Osi$ corresponding to the selected portion W to be inserted.

9. An electronic circuit for receiving an applied series of electrical input signals representing a digital information group and for generating a series of output signals corresponding to a desired serial portion of the series of input signals, said series of output signals occupying a time position shifted by a desired amount with respect to said series of input signals, said circuit comprising: a shifting circuit; means coupled to said shifting circuit for applying the series of input signals to said shifting circuit; means for producing shift control signals indicating the desired amount of shift; means coupled to said shifting circuit and to said means for producing shift control signals for applying said shift control signals to said shifting circuit, said shifting circuit being responsive to said series of input signals and to said shift control signals for producing a signal series shifted by the desired amount with respect to the input signals; means for producing a selection signal during an interval of time when the desired serial portion is to be selected from said shifted signal series; and output circuit means coupled to said shifting circuit for receiving said shifted signal series, and coupled to said means for producing a selection signal and responsive to said selection signal for producing the series of output signals.

10. An electronic circuit for simultaneously shifting the time position of, and selecting a desired serial portion of, an applied series of electrical input signals representing a digital information group, said circuit comprising: a delay circuit for delaying said series of input signals by an integral number of signal positions; means for producing shift control signals indicating the number of positional units of delay corresponding to a desired shift; means coupled to said delay circuit and to said means for producing shift control signals, for applying the series of input signals and the shift control signals to said delay circuit, said delay circuit being responsive to said signals for producing a delayed signal series corresponding to said input series but delayed with respect thereto; means for producing a selection signal during an interval of time when the desired serial portion is to be selected from said delayed signal series; and output circuit means coupled to said delay circuit for receiving said delayed signal series, coupled to said means for producing a selection signal and responsive to said selection signal for producing a series of output signals representative of the selected shifted serial portion of said series of input signals.

11. In a high speed serial computer including an arithmetic unit and a memory having a plurality of fixed word length memory locations, a circuit for rapidly transferring between the memory and the arithmetic unit operands and resultants corresponding in length to only a portion of the fixed word length, and for simultaneously shifting the time positions of both the operands and resultants to provide proper timing relations within the arithmetic unit and also to utilize fully the capacity of the memory by storing a plurality of operands or resultants in each fixed word length memory location, said circuit comprising: a delay circuit selectively operable for inserting a time delay corresponding to an integral number of serially applied digits; first means coupled to said delay circuit for applying thereto a series of electrical input signals corresponding to a digital information group having the fixed word length; second means for producing shift control signals indicating a desired shift in the time position of said series of input signals; third means coupled to said second means and to said delay circuit for applying said shift control signals to said delay circuit, said delay circuit being responsive to said series of input signals and to said shift control signals for producing a delayed signal series corresponding to said series of input signals after the desired shift; fourth means for producing a selection signal during a time interval when a desired serial portion corresponding to an operand or resultant is to be selected from said delayed signal series; and output circuit means coupled to said delay circuit for receiving said delayed signal series, coupled to said fourth means and responsive to said selection signal for producing an output signal series representing an operand or resultant in the desired shifted time relationship.

12. In a serial computer having a fixed word length corresponding to $n$ digits, a circuit for receiving an applied signal series representing $n$ digits, for selecting a portion W thereof and for shifting said selected portion W either to left or to right, shifting being accomplished by providing a selected time delay equal to the number of digits of a desired left shift or equal to $n$ minus the number of digits of a desired right shift, said circuit comprising: delay means; first means coupled to said delay means for applying thereto a set of control signals indicating the selected time delay; second means coupled to said delay means for applying the applied signal series thereto, said delay means being responsive to the applied signal series and to said set of control signals to produce a delayed signal series corresponding to the applied signal series after the selected time delay; third means for producing a selection signal during an interval of time when the portion W is to be selected from said delayed signal series; and output circuit means coupled to said delay means and to said third means and responsive to said delayed signal series and to said selection signal for producing the selected portion W in the desired shifted time relationship.

13. An electronic circuit for shifting the time position of an applied series of electrical input signals representing a digital information group and for simultaneously selecting a desired serial portion thereof, said circuit comprising: a shifting circuit; means coupled to said shifting circuit for applying the series of input signals thereto; means for producing shift control signals indicating a desired amount of shift; means coupled to said shifting circuit for applying said shift control signals thereto, said shifting circuit being responsive to said series of input signals and to said shift control signals for producing a signal series shifted by said desired amount with respect to the input signals; means for producing a selection signal during a time interval when the desired serial portion is to be selected from said shifted signal series; and output circuit means coupled to said shifting circuit for receiving said shifted signal series, coupled to said means for producing a selection signal and responsive to said selection signal for producing a series of output signals corresponding to the shifted desired serial portion of the series of input signals.

14. In combination, means for providing pluralities of signals representing digital information grouped into words having particular numbers of digital positions and for presenting the signals for use, matrix means for receiving signals representing various parameters controlling the shift and usage of the information signals and for operating upon these signals to produce first control signals representing the amount of digital positions for shifting the signal information in all of the digital positions in each word and to produce second control signals for activating the information signals in a particular number of digital positions, means responsive to the first control signals and to the information signals for receiving the first control signals to shift all of the information signals in each word by a particular number of digital positions in accordance with the control signals, and output means responsive to the second control signals and to the shifted information signals for receiving the shifted signal information for all of the digital positions in each word and for passing the signal information only in the activated digital positions for each word in accordance with the second control signals.

15. Data processing apparatus for use with a computer having a memory, including, means for providing pluralities of signals representing digital information grouped into words having particular numbers of digital positions and for presenting the signals for use, means for providing signal indications representing various parameters including the amounts of positional shift to be made in the signal information in each word, including the direction of these shifts as in a forward or retarded direction with respect to the sequential presentation of the signal information and including the direction of transfer of the signal information between the data processing apparatus and the computer memory, matrix means responsive to the signal indications representing the various parameters for operating upon these signals to provide first signals for controlling the number of digital positions to shift information in each word and to provide second signals for controlling the number of digital positions to be activated in each word, means for providing timing signals indicating the sequential presentation of the digital positions and for using these signal indications to provide signal indications representing a count of the digital positions in each word, means responsive to the first control signals and the information signals for shifting the information signals in accordance with the controls provided by the control signals, means responsive to the second control signals and the signal indications from the counting means for comparing the second control signals and the signal indications from the counting means to provide activating signals for a particular number of digital positions in each word, and means responsive to the activating signals and the shifted information signals in all of the digital positions for each word for passing only the shifted information signals in the activated positions for each word.

16. In combination, means for providing a plurality of signals representing digital information grouped into words having particular numbers of digital positions and for presenting the signals for use, matrix means for receiving signals representing parameters controlling the shift and usage of the digital information and for using these signals to provide first control signals representing the number of digital positions for shifting all of the signal information in each word and to provide second control signals representing the particular digital positions in each word to be activated, means for directly receiving the information signals in all of the digital positions for each word and responsive to the first control signals for shifting the information signals in all of the digital positions in accordance with the controls provided by the first control signals, means for providing timing signals at each digital position and for counting these signals to provide signal indications representing the number of digital positions presented at any time in a word, logical network means responsive to the second control signals and the signal indications from the counting means for comparing the second control signals and the signal indications from the counting means to provide activating signals during the particular digital positions in each word to be activated, and means responsive to the activating signals and the shifted signal information for receiving the shifted signal information in all of the digital positions and for passing the shifted signal information only at particular digital positions in accordance with the activating signals.

References Cited in the file of this patent

A Functional Description of the EDVAC, University of Pennsylvania, November 1, 1949, volume I, pp. 2–41 to 2–56; volume II, drawings (104–2LC–10); (104–2LC–9); (104–2LD–12); (104–2LD–7).

UNITED STATES PATENT OFFICE

Certificate of Correction

Patent No. 2,969,913 January 31, 1961

Alvin A. Cherin et al.

It is hereby certified that error appears in the above numbered patent requiring correction and that the said Letters Patent should read as corrected below.

Column 7, line 19, after "word" insert —are—; line 36, for "D" read —$D^j$—; same column 7, line 75, for "$\overline{C}o$" read —$Co$—; column 8, line 43, after "the" insert —end of the—; column 9, line 41, before "the", first occurrence, insert —and—; column 11, line 5, for "$Wr$ and $Wl$" read —$Wr^j$ and $Wl^j$—; line 26, for "$Wl$" read —$Wl^j$—; same column 11, line 53, for "repersents" read —represents—; column 12, line 29, for "Y" read —$Y^3$—; column 15, line 74, for "$Wr$ and $Wl$" read —$Wr^1$ and $Wl^1$—; column 16, line 3, for "$\overline{C}^1$" read —$\overline{C}^l$—; column 17, line 4, for that portion of the function reading "$=B^2.Wr^1$" read — $=B^2.(Wr^1$ —; column 18, line 28, for that portion of the function reading "$=B^1.\overline{L}_2.$" read — $=B^1.\overline{L}^2.$ —; line 34, for that portion of the function reading "$.R^4B^2.$" read —$.R^4+B^2.$—; column 19, line 13, for "$Sr$" read —$Sr^j$—; line 57, for "F(3)" read —E(3)—; column 20, line 29, for "$T_2{}^c$" read —$T_2{}^\circ$—; column 23, line 57, for "$E^1$" read —$E^j$—; line 63, for $$n \geqq 1 - Wl^j \geqq t \geqq Wr^j + 1 \qquad \text{read} \qquad n - 1 - Wl^j \geqq t \geqq Wr^j + 1$$

Signed and sealed this 19th day of September 1961.

[SEAL]

Attest:

ERNEST W. SWIDER, DAVID L. LADD,

*Attesting Officer.* *Commissioner of Patents.*